United States Patent
Cottle et al.

(10) Patent No.: US 12,140,237 B2
(45) Date of Patent: Nov. 12, 2024

(54) COMPACT INLINE OVER-PRESSURIZATION PROTECTION DEVICE

(71) Applicant: GAS TECHNOLOGY INSTITUTE, Des Plaines, IL (US)

(72) Inventors: Travis Cottle, Glenview, IL (US); Francis X. Hennessey, III, Arlington Heights, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 436 days.

(21) Appl. No.: 17/507,969

(22) Filed: Oct. 22, 2021

(65) Prior Publication Data

US 2022/0128160 A1  Apr. 28, 2022

Related U.S. Application Data

(60) Provisional application No. 63/104,238, filed on Oct. 22, 2020.

(51) Int. Cl.
*F16K 17/04* (2006.01)
*F16K 17/164* (2006.01)

(52) U.S. Cl.
CPC ........ *F16K 17/164* (2013.01); *F16K 17/0406* (2013.01); *F16K 17/042* (2013.01); *F16K 17/0466* (2013.01)

(58) Field of Classification Search
CPC ... F16K 17/164; F16K 17/0406; F16K 17/042
See application file for complete search history.

(56) References Cited

U.S. PATENT DOCUMENTS

| | | | | |
|---|---|---|---|---|
| 1,817,127 A | * | 8/1931 | Crockett | F16K 15/046 123/73 V |
| 9,970,568 B2 | | 5/2018 | Jing et al. | |
| 10,571,038 B2 | | 2/2020 | Roth et al. | |
| 2011/0277850 A1 | * | 11/2011 | Greene, III | F16K 17/042 137/538 |
| 2014/0000723 A1 | * | 1/2014 | Bassett | F16K 17/164 137/12 |

FOREIGN PATENT DOCUMENTS

CA  2 842 828 A1  10/2008

* cited by examiner

*Primary Examiner* — P. Macade Nichols
(74) *Attorney, Agent, or Firm* — Pauley Erickson & Swanson

(57) ABSTRACT

A device and method for shutting off fluid-flow in a pipe. The device includes a moveable sealing member inside a pipeline, a longitudinal spring configured to bias against the sealing member in a first direction, and a lateral spring at an angle to the longitudinal spring wherein the lateral spring is configured to bias against the sealing member in a second direction. The device includes a housing with a passage configured to be positioned inline with a pipeline, and a sealing seat. A locking element is biased against the sealing member using the lateral spring to maintain an open position with the sealing member off of the sealing seat. The locking element is configured to move from the sealing member upon a fluid overpressure in the passage, whereby the sealing member extends into the seal seat to close off the pipeline upon the overpressure.

20 Claims, 48 Drawing Sheets

COMPACT INLINE OVER-PRESSURIZATION PROTECTION DEVICE

CROSS REFERENCE TO RELATED APPLICATION

This application claims the benefit of U.S. Provisional Application, Ser. No. 63/104,238, filed on 22 Oct. 2020. The provisional application is hereby incorporated by reference herein in its entirety and is made a part hereof, including but not limited to those portions which specifically appear hereinafter.

BACKGROUND OF THE INVENTION

This invention relates generally to a valve which prevents undesired gas flow through a passage and, more particularly, to a compact spring-activated inline over-pressurization protection device for a low pressure system.

Natural gas distribution systems deliver gas to consumers through a series of pipes and valves. Regulatory valves control the pressure of the gas as it travels to consumer locations. The natural gas is normally transmitted at a high pressure coming from the distribution system, with the pressure being reduced as the gas approaches consumer locations. When a natural gas or similar company needs to perform maintenance operations on a gas line, they may create a bypass around the part of the distribution system needing repair. This bypass keeps servicing homes that are downstream of the maintenance area. Such bypasses may sometimes inadvertently be placed around a regulator which can cause the feed to the downstream service locations to receive a pressurized gas that is too high. This higher pressure can result in a pressure level that homes and/or gas appliances within the homes cannot handle. Such consequences of an elevated pressure can lead to appliance failure and explosions in extreme cases. This can also occur when regulators, which regulate the pressure of the gas as the gas approaches consumer homes, become faulty and do not regulate the pressure of the gas down to an applicable level.

Therefore, there is a need for passive shut-off valves for gas distribution systems to protect homes from an excess of pressure being passed through a low pressure gas line.

SUMMARY OF THE INVENTION

The invention generally relates to a shut-off valve for use in fluid (e.g., gas) distribution systems. The general object of the invention can be attained, at least in part, through an inline device.

Embodiments of the invention include a device for shutting off fluid-flow in a pipe. The device includes a moveable sealing member within a pipeline, a longitudinal spring configured to bias against the sealing member in a first direction (e.g., towards a closed position), and a lateral spring at an angle to the longitudinal spring wherein the lateral spring is configured to bias against the sealing member in a second direction. The lateral spring maintains the sealing member in an open position, such as via a locking element, and a spring pressure of the lateral spring is less than a predetermined overpressure of a fluid in the pipeline so that the spring is overpowered by any overpressure.

Embodiments of this invention include a device with a housing having a passage configured to be positioned inline with a pipeline, and the passage including a sealing seat to receive a sealing member that is disposed inside the housing. A longitudinal spring is biased against the sealing member toward the sealing seat. A locking element is biased against the sealing member to maintain an open position with the sealing member off of the sealing seat. The locking element is configured to move from the sealing member upon a fluid overpressure in the passage, whereby the sealing member extends into the seal seat to close off the pipeline. A lateral spring, disposed at an angle (e.g. perpendicular) to the longitudinal spring, biases against the locking element to bias the locking element against the sealing member.

In embodiments of this invention, in an operating position, the inline device allows the flow of gas to pass therethrough as gas migrates through a distribution system from the gas source to a destination (such as a consumer's home or an industrial building). The inline device includes a valve body with, for example, a ball seal that is spring loaded. The ball seal can be pushed in the same direction as the flow of gas. At least one lock holds the ball seal in place prior to an over-pressurization. The lock is preferably controlled by at least one lateral spring. The lateral spring is aligned, for example, in a direction that is perpendicular to the flow of gas and the movement of the ball seal. If and when the gas passing through the device is pressurized to a point higher than a desired pressure, the excess pressure pushes on the lock, causing the lateral spring to contract. When the lateral spring contracts the lock moves, which releases the ball seal. An additional longitudinal spring, generally colinear with the fluid flow and passage, is used to push the ball seal to a seat position to separate and close off the high-pressure gas flow.

After the excess pressure is removed, the ball seal may be manually shifted back to its original position, preferably with a handle or lever on the device. As the handle or lever is moved, the ball seal member contacts the lock. The lock is temporarily pressed outward as the ball seal puts pressure on the lock. Simultaneously, the lateral spring contracts to make room for the ball seal to reset to the original (open) position of the ball seal. Once the ball seal is back to the original position, the contraction in the lateral spring is released. The lateral spring is therefore extended, pushing the lock back to its original position, holding the ball seal in place so that gas can flow through the inline device again.

In other embodiments of the invention, the lock may be held in place in the retracted position, allowing the ball seal to be freely reset to the original position. Once the ball seal is back to the original position, the lock may be released to hold the ball seal in the original position. In other embodiments the lock may be pushed towards a center of the device by utilizing a wedge on the lock and a pin in the ball seal to move the ball seal back to the original position. In other embodiments the device may be consumable after use. That is, after excess pressure is removed, at least a portion of the device may be removed from the device, and replaced with a new portion, rather than be reset. Additionally, a housing of the device may remain in a gas line while any moving components of the device may be incased in a cartridge. The cartridge may be removed and either reset or replaced with a new cartridge without the user having to adjust the gas service line.

The prior art generally fails to provide an adequate shut-off valve device that is both inline and compact, as in the subject invention. Many other valves take up additional space in the system and need to be placed around or otherwise outside of the gas service line, whereas the inline device of the claimed invention can be placed directly in the gas service line without disrupting the flow of gas before activation of the device.

Other objects and advantages will be apparent to those skilled in the art from the following detailed description taken in conjunction with the appended claims and drawings.

DETAILED DESCRIPTION OF THE INVENTION

The present invention provides an inline device for shutting off, for example, a flow of gas in a gas line. The inline device shuts off the flow of gas and prevents any gas from proceeding through the device. The inline device is triggered to engage once a predetermined pressure level is reached inside a body of the device. To engage the inline device a spring mechanism is used. A force of the spring mechanism allows the inline device to lock and unlock a seal which controls a flow of gas within the body of the device. As shown throughout the figures, embodiments of the invention include a closure element moveable by a longitudinal spring mechanism from an opened to a closed position. In the opened position, the closure element allows gas to freely flow through the inline device and the rest of the gas line. In the closed position, the closure element is moved to a sealed position, which closes off the flow of gas. The closure element is moved to the closed position when the gas traveling through the body of the device is at an excess pressure.

Figure 1:
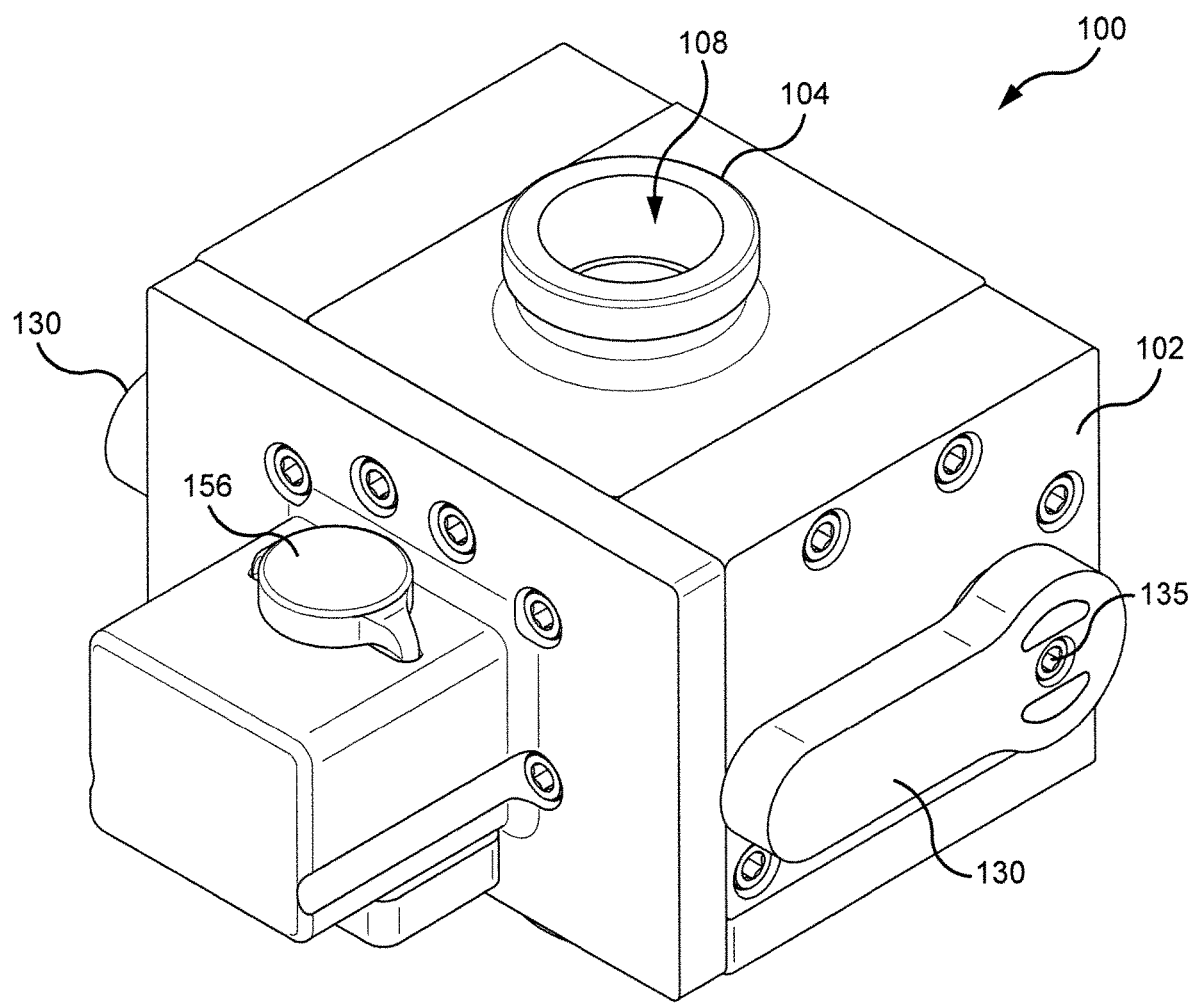
FIG. 1 is a perspective view of an inline device, according to one embodiment of the invention.
Figure 2:
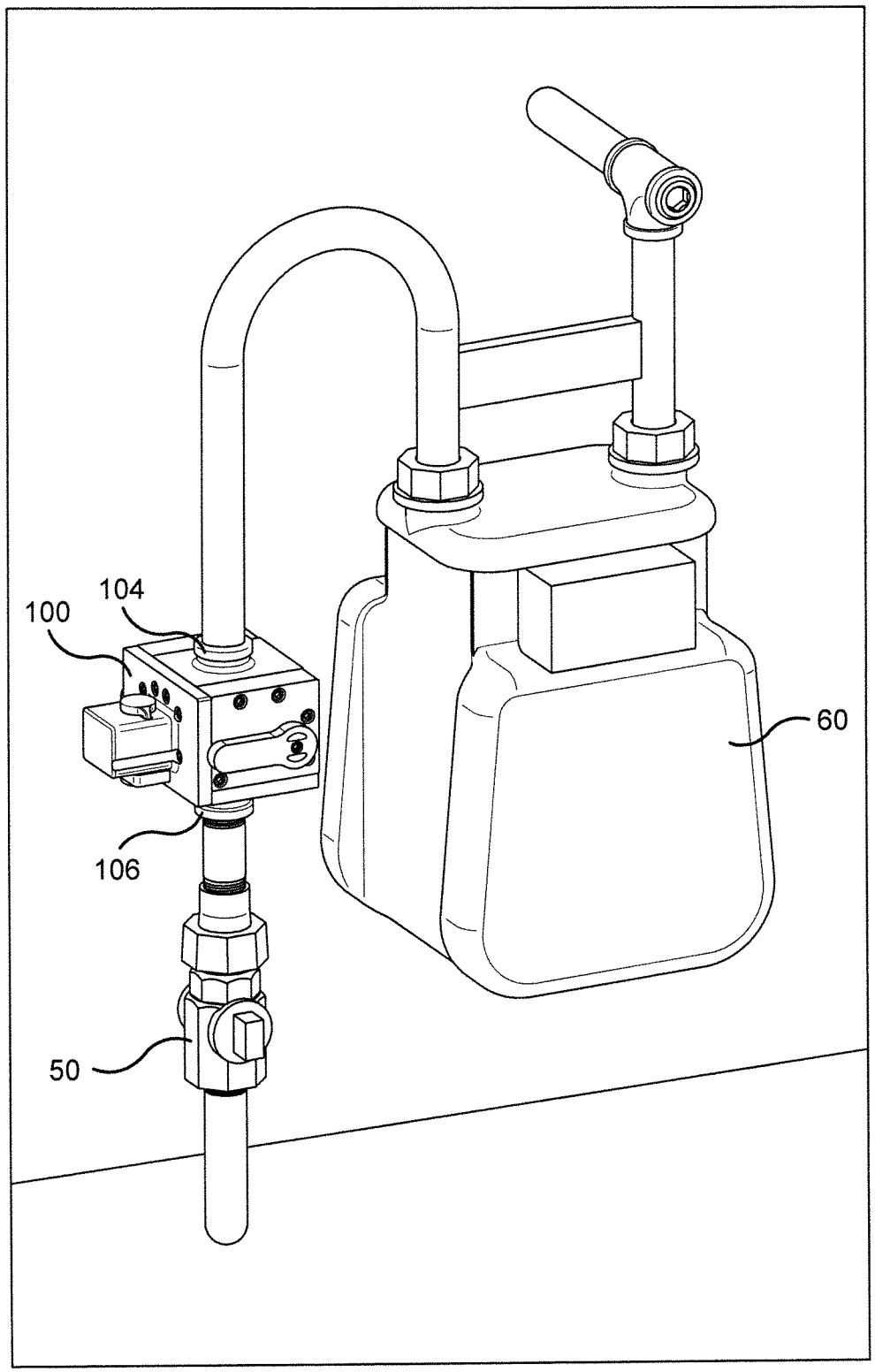
FIG. 2 shows an installed inline device according to the embodiment of FIG. 1.

FIGS. 1-6 show a device 100 for shutting off fluid-flow in a pipe, according to one embodiment of this invention. Unlike other shut-off-valve devices, the device of the present invention can be compact and installed inline, such as shown in FIG. 2. The inline device is preferably made for pipe sizes of ¾" NPT and 1" NPT, although other sizes may be used as well. Due to its compact nature, the inline device 100 can be placed directly in a gas service line preferably after a service valve 50 and before a meter 60, as shown in FIG. 2. Particularly in densely populated, more urban areas, regulators are often much further upstream, resulting in a low pressure system. During maintenance on these low pressure systems, the regulators may be consequentially bypassed. Having the inline device 100 before the meter 60 to a dwelling allows the device 100 to protect the dwelling from excess pressure that may be bypassing a regulator.

The device 100 includes a housing 102, enclosing a moveable sealing member for closing off the pipeline. Using the sealing member that is in line with gas flow, the flow of gas goes through the inline device without disrupting the flow of gas before activation of the inline device. The housing 102 includes pipe attachments 104 and 106, connected on either end of an internal passage 108, for attachment to the pipeline.

Figure 3:
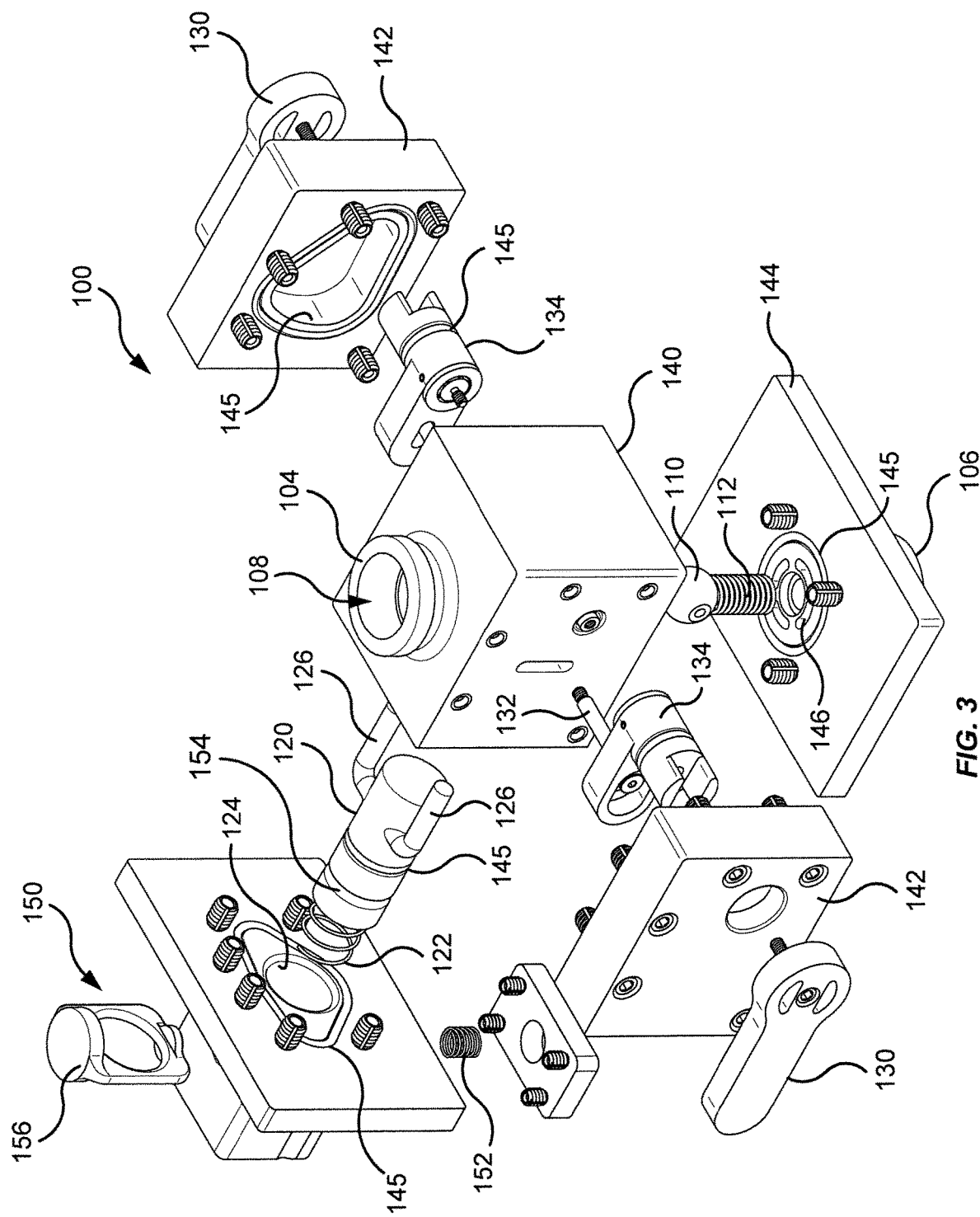
FIG. 3 shows an exploded view of the inline device according to the embodiment of FIG. 1.

FIG. 3 is an exploded view of the device 100, showing the internal and external components. The sealing member is a ball seal 110 in combination with a longitudinal spring 112, which biases the ball seal 110 toward a ball seat 114 (See FIG. 4B). The ball seal 110 in contact with the ball seat 114 closes off the fluid flow through the pipeline. A locking element 120 is used to keep the ball seal 110 in the open position, off the ball seat 114, until an overpressure condition occurs.

The locking element 120 is contained in a lateral locking element passage 124, at an angle (e.g., perpendicular) to the passage 108. A lateral spring 122 biases the locking element 120 toward the ball seal 110. The locking element of FIGS. 3-5 includes two arms 126 that hold the ball seal 110, however other locking element structures can be used, such as, without limitation, one arm or any other extension type (e.g., above the ball seat), or an angled or shaped surface that fits about an upper side or end of the ball seal 110.

Figure 4A:
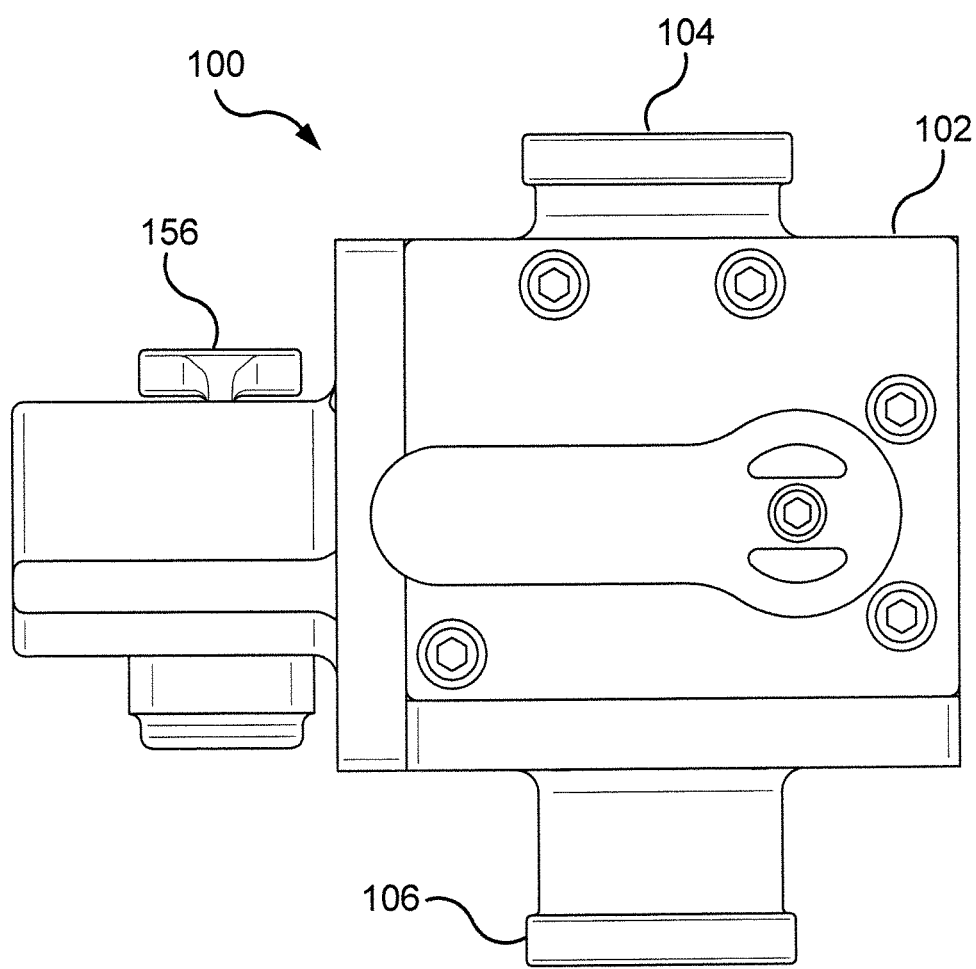
FIGS. 4A-C show side and cross-sectional views of the inline device according to the embodiment of FIG. 1, in an open position.
Figure 4B:
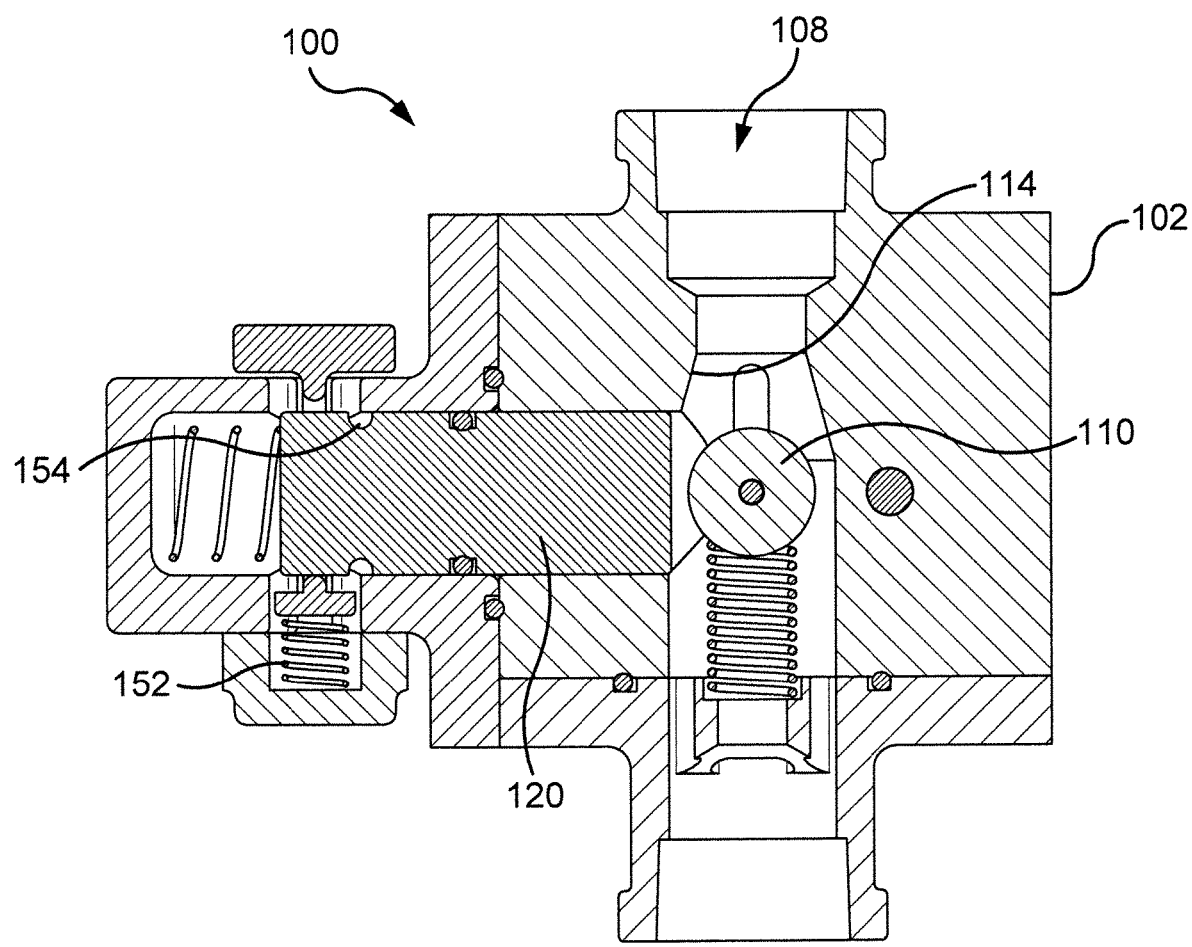
Figure 4C:
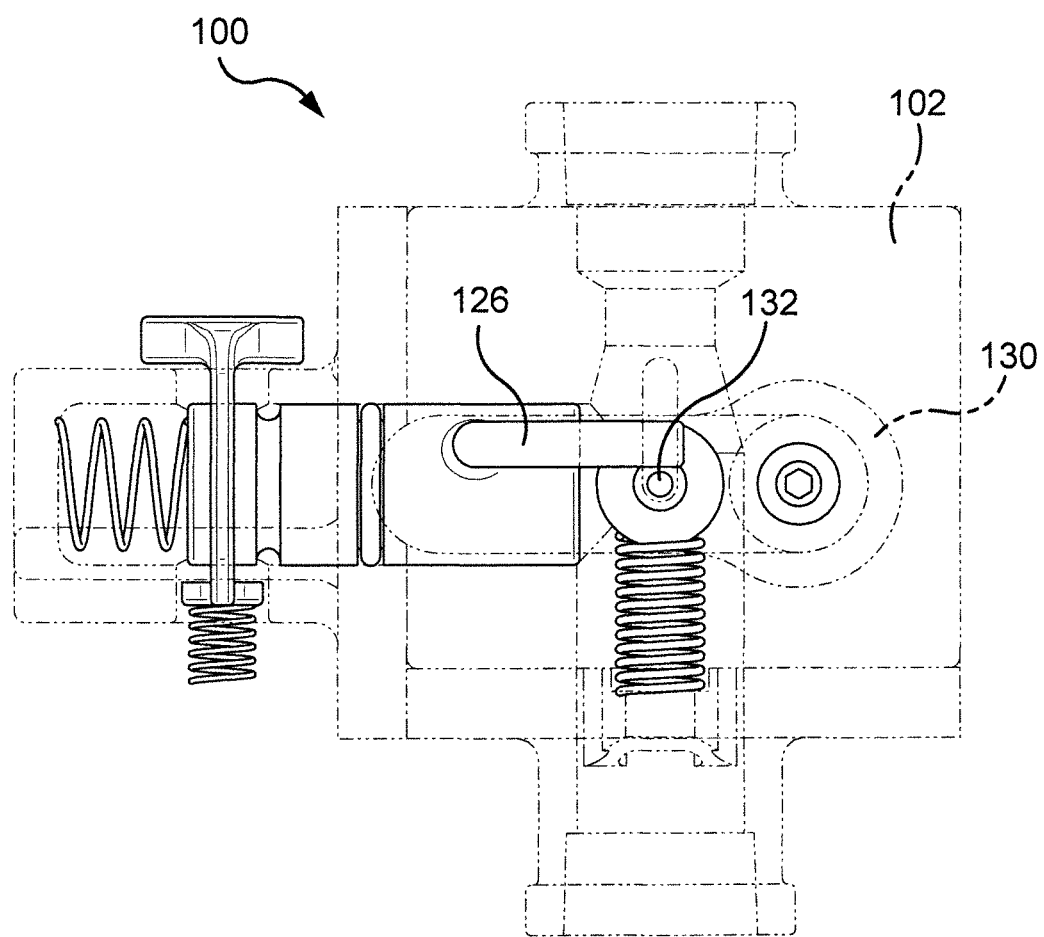
Figure 5A:
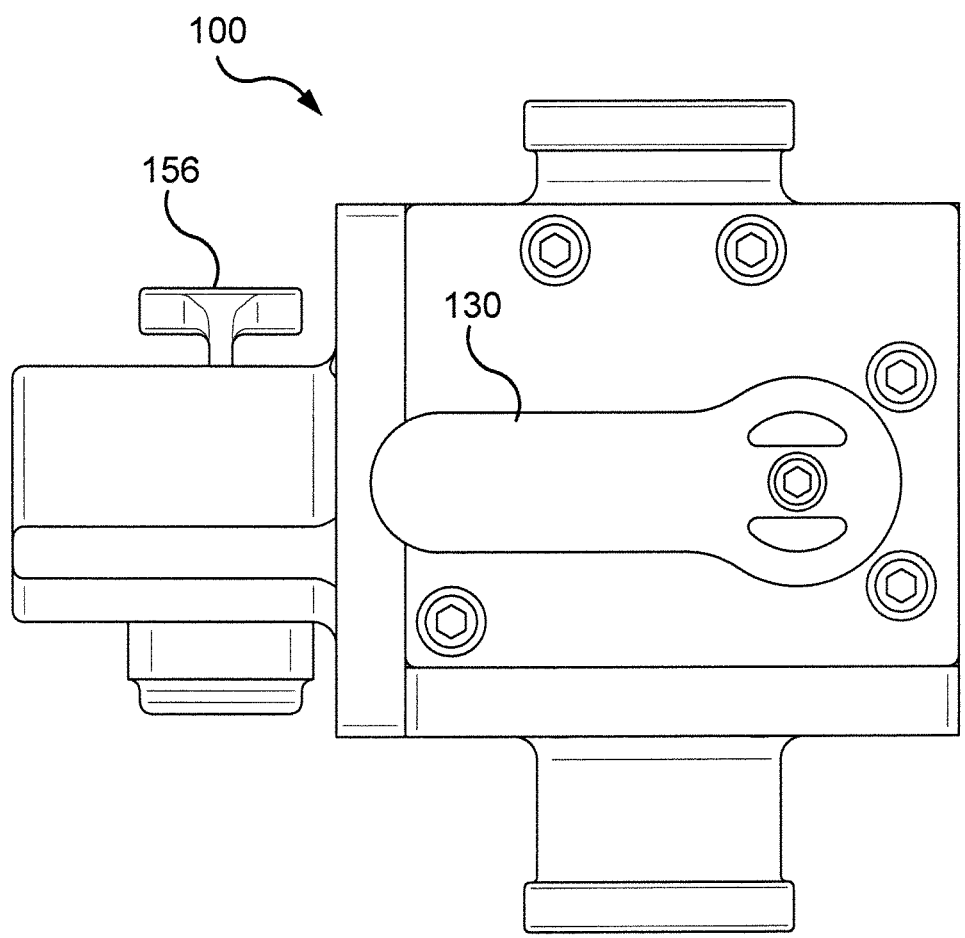
FIGS. 5A-C show side and cross-sectional views of the inline device according to the embodiment of FIG. 1, in an overpressure intermediate position.
Figure 5B:
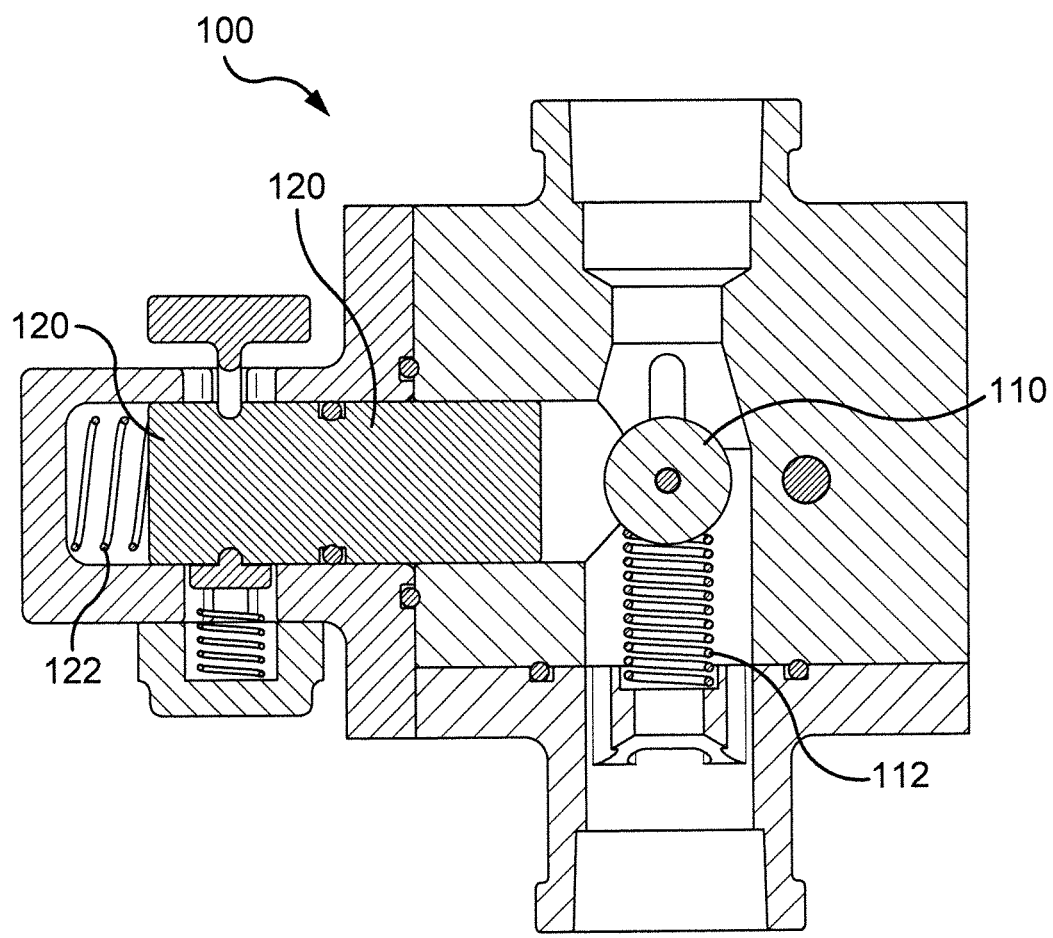
Figure 5C:
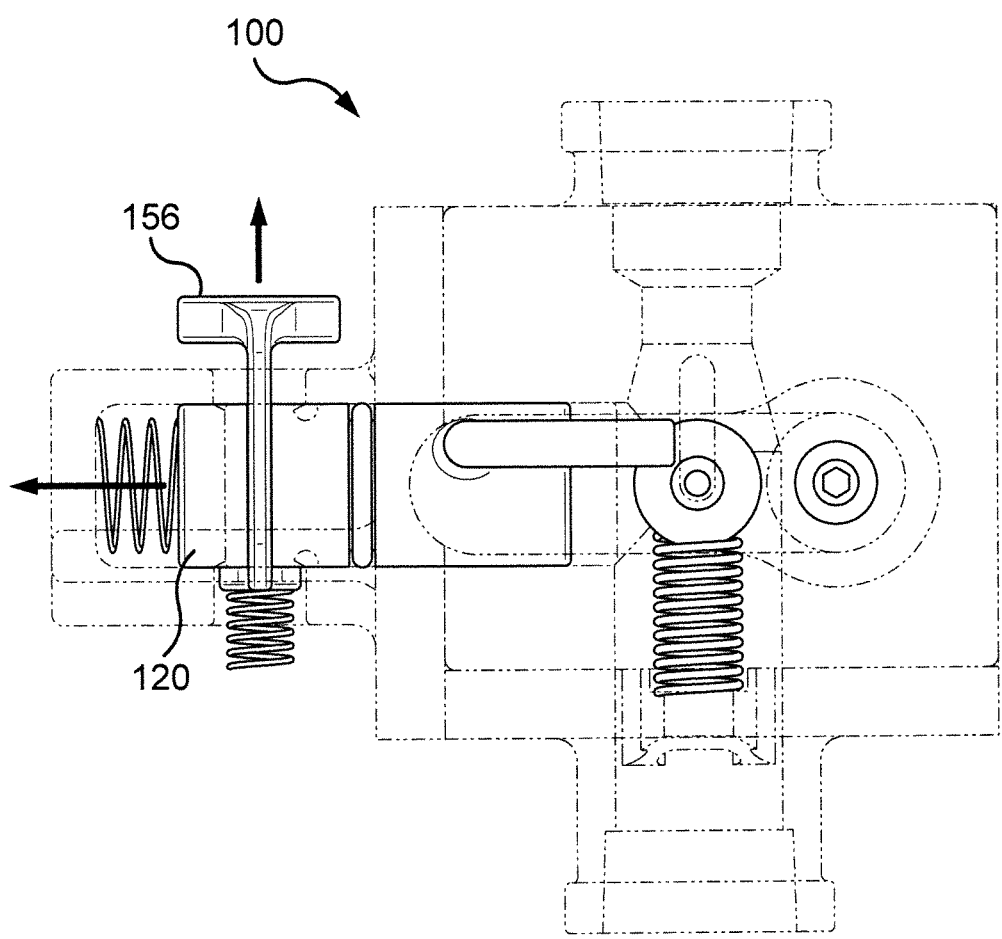
Figure 6A:
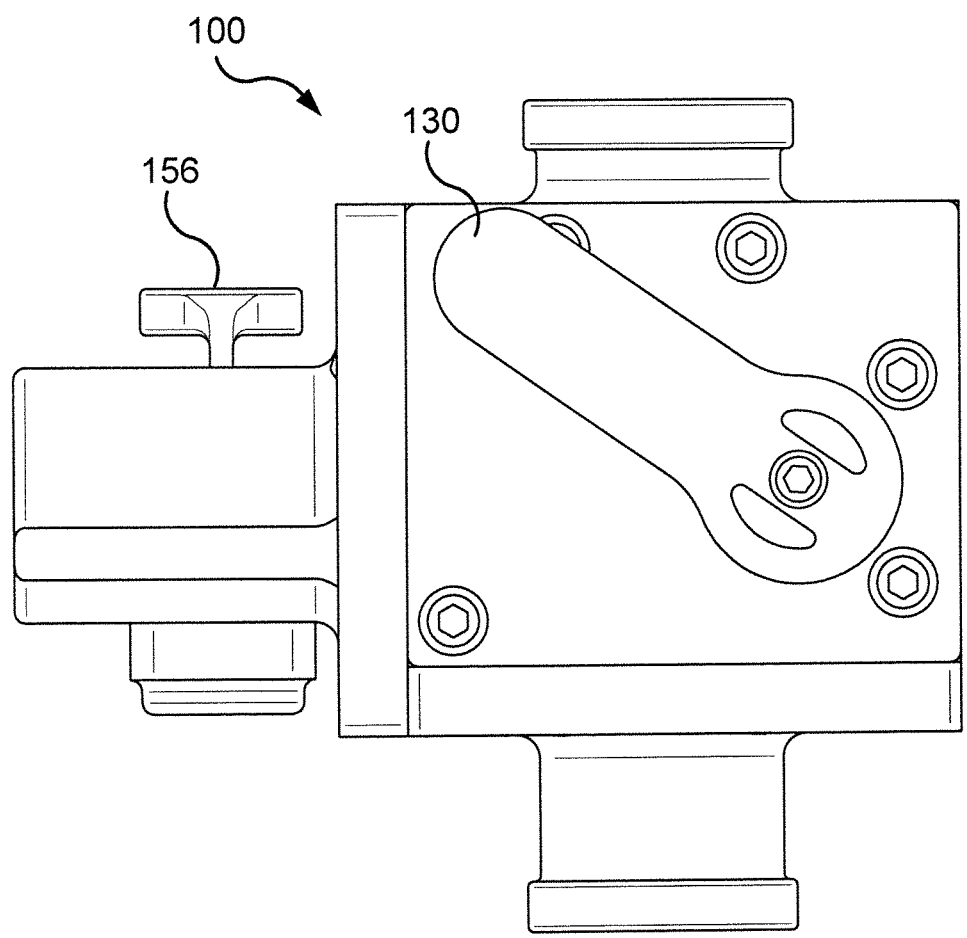
FIGS. 6A-C show side and cross-sectional views of the inline device according to the embodiment of FIG. 1, in a closed position.
Figure 6B:
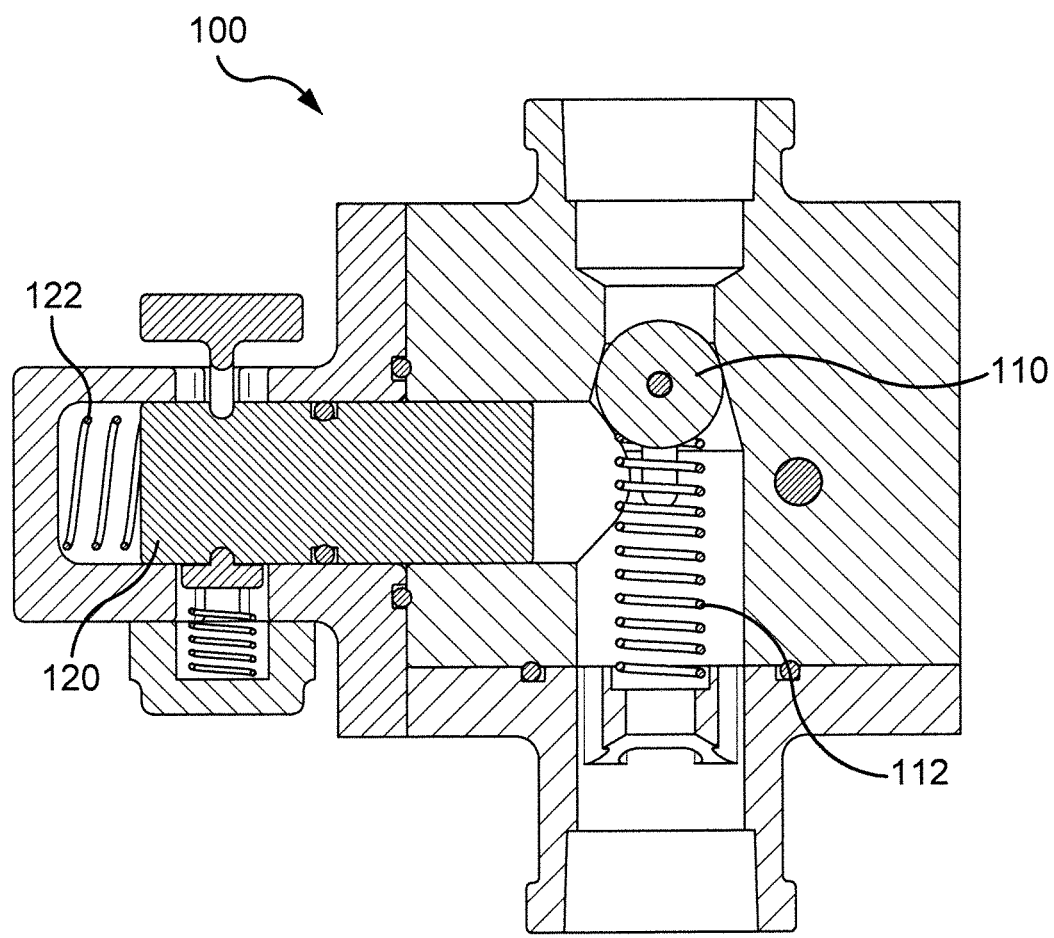
Figure 6C:
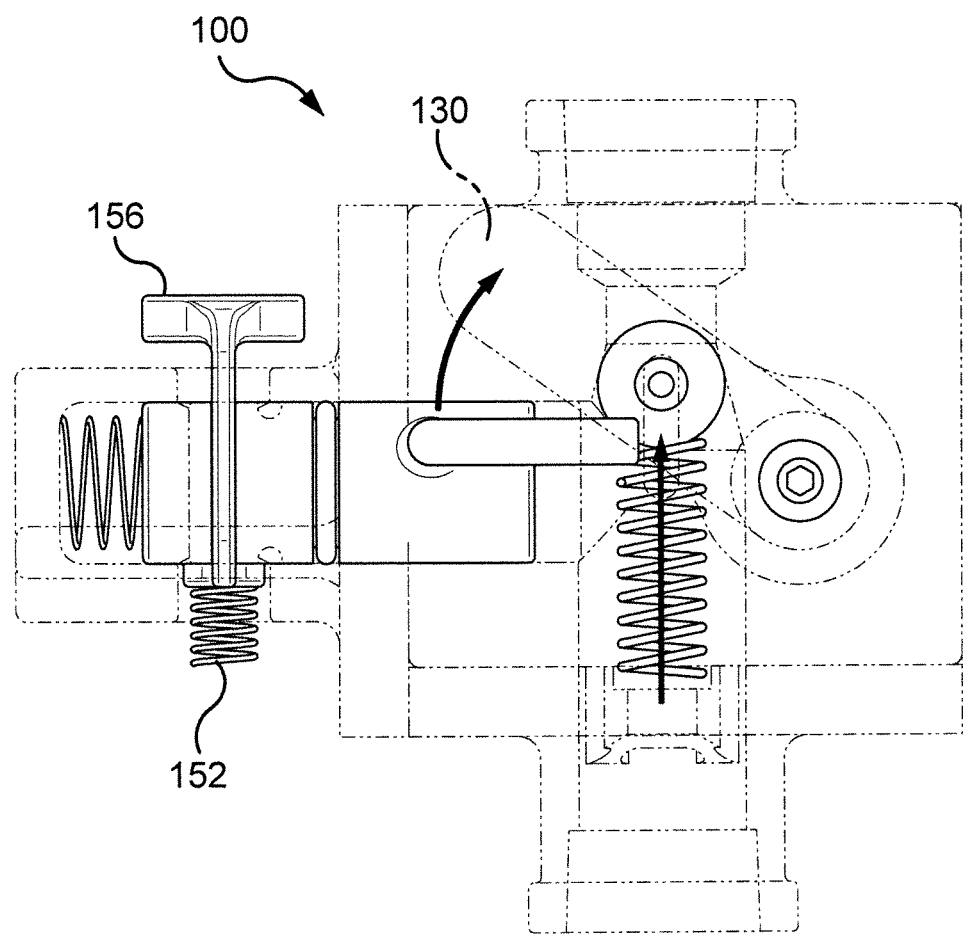
Figure 7:
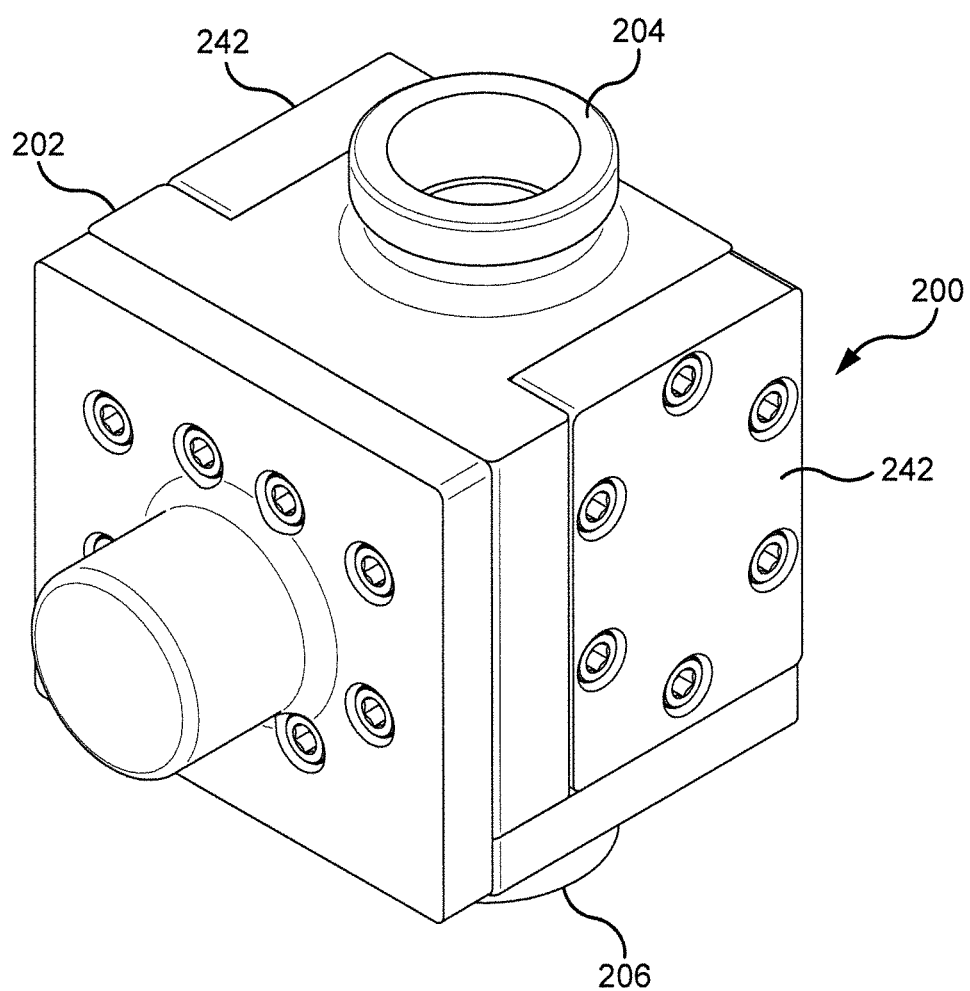
FIG. 7 is a perspective view of an inline device, according to one embodiment of the invention.
Figure 8:
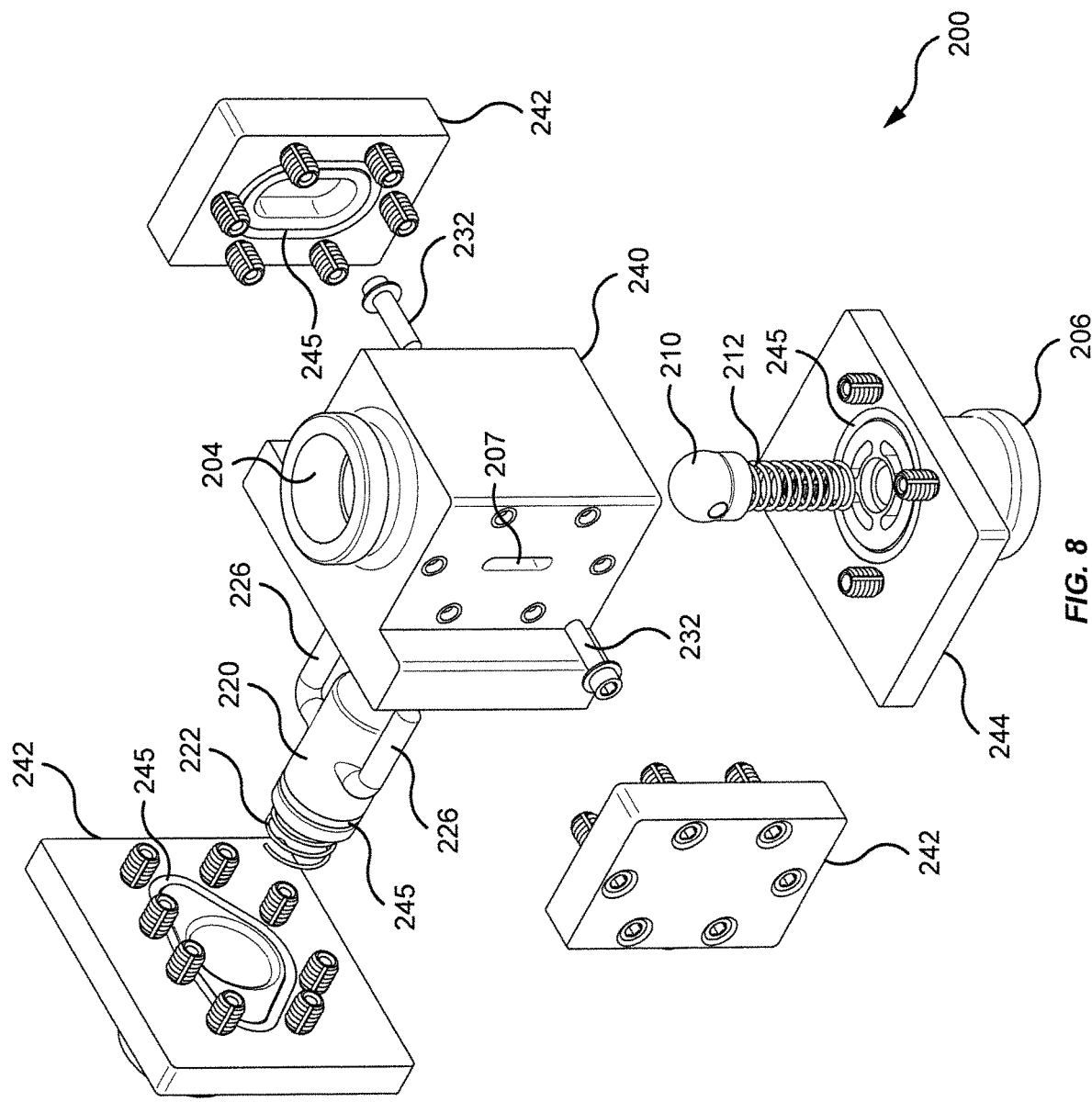
FIG. 8 is an exploded view of the device according to FIG. 7.

FIGS. 4A-C show the device 100 in the open position, with the ball seal secured by the locking element 120. If and when the fluid in the pipeline reaches a sufficient overpressure, the pressure in the passage 104 pushes on the locking element and overcomes the spring pressure from the lateral spring 122. The locking element rescinds into the passage 124 and releases the ball seal 110, as shown in FIGS. 5A-C. The spring 112 then pushes the ball seal 110 into the seal seat 114 to close the pipeline, as shown in FIGS. 6A-C, and keep the overpressure from reaching the upstream meter and dwelling.

Embodiments of this invention include a reset mechanism for reopening and resetting the device for further overpressure detection. The embodiment of FIGS. 1-6 includes levers 130 extending outside of the housing 102, for manual activation to return the ball seal 110 to the opened position after the over-pressurization is removed. The manual levers 130 are used to reopen the flow of gas passing through the body. In the lever position shown in FIG. 1, gas is freely flowing through the inline device. FIG. 6A-C show the levers 130 moved upward on the device 100 in the closed position. The levers 130 are connected to the ball seal 110 by a shaft 132 (e.g., a bolt or pin, etc.) that extends through a passage in the ball seal 110, and travels upward with the ball seal 110, thereby lifting the levers 130. In this illustrated embodiment, the arms 126 of the locking element extend over the shaft 132 in the open position, to secure the ball seal 110 in the open position. The rotation axis 135 of the levers 130 are offset from the shaft 132, with a cam element 134 between each lever 130 and the shaft 132.

As illustrated, the housing 102 includes an internal passage housing 140, and side panels 142 for attaching, securing, and covering components of the release mechanism. A bottom panel 144 includes a spring seat 146. Sealing rings 145 extend around or between components to seal in the fluid in the pipeline.

The embodiment of FIGS. 1-6 includes a secondary locking mechanism 150 to keep the locking element from reengaging before the ball seal 110 is reset. The secondary lock 150 is raised by spring 152 into a corresponding groove 154 on the locking element 120 when the locking element 120 is pushed back by the overpressure. The secondary lock 150 includes and external button 156 that raises upon activation. As shown in FIGS. 5B and 6B, the locking element 150 secures the locking element away from the ball seal 110. Upon resetting the device 100 with the levers 130 moved back down to the original, opened position, the button 156 is pushed to remove the secondary lock 150 from the groove 154 to allow the locking element 120 to move into the reset and locked position via lateral spring 122

When suitably pressurized fluid is flowing through the device, the locking element with the lateral spring restricts the sealing member from moving to the closed position. In the open position, the lateral springs preferably apply less than 2 psi to the locking element and/or sealing member. In other embodiments the lateral springs may apply 0.5 psi, 1 psi, or any other psi depending on a set pressure limit for a particular distribution system. When there is excess pressure inside the housing, the excess gas pressure pushes the lock into the lateral springs, releasing the sealing member, allowing for the longitudinal spring to push the ball seal into the corresponding seat, forming the seal in the fluid path in the closed position. The excess pressure can then be removed from the device by turning off the flow of gas going into the device. Once the excess pressure has been removed, the lateral spring may push the lock back to the center of the device.

Figure 9A:
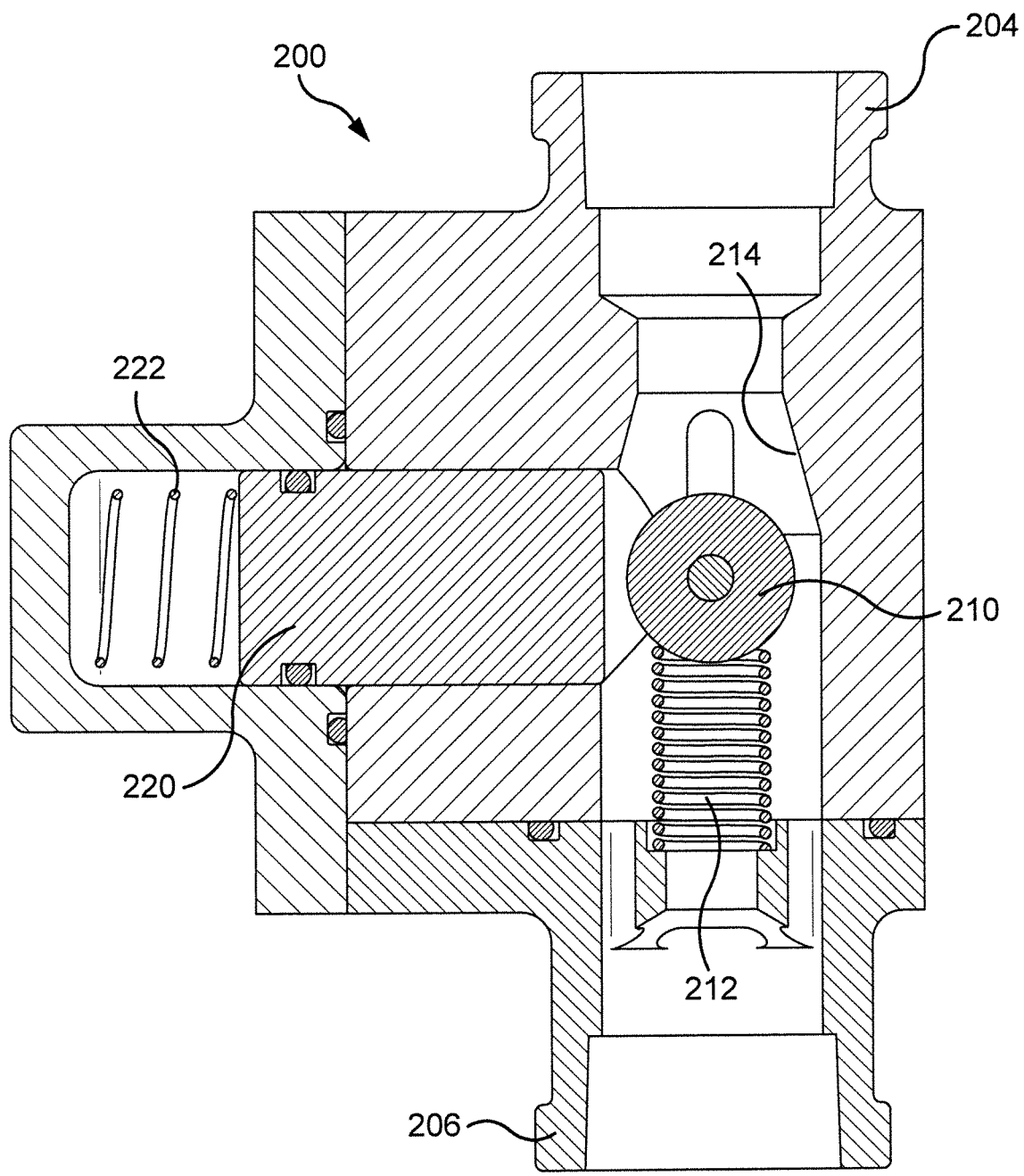
FIGS. 9A-C show cross-sectional and phantom views of the inline device according to the embodiment of FIG. 7, in an open position.
Figure 9B:
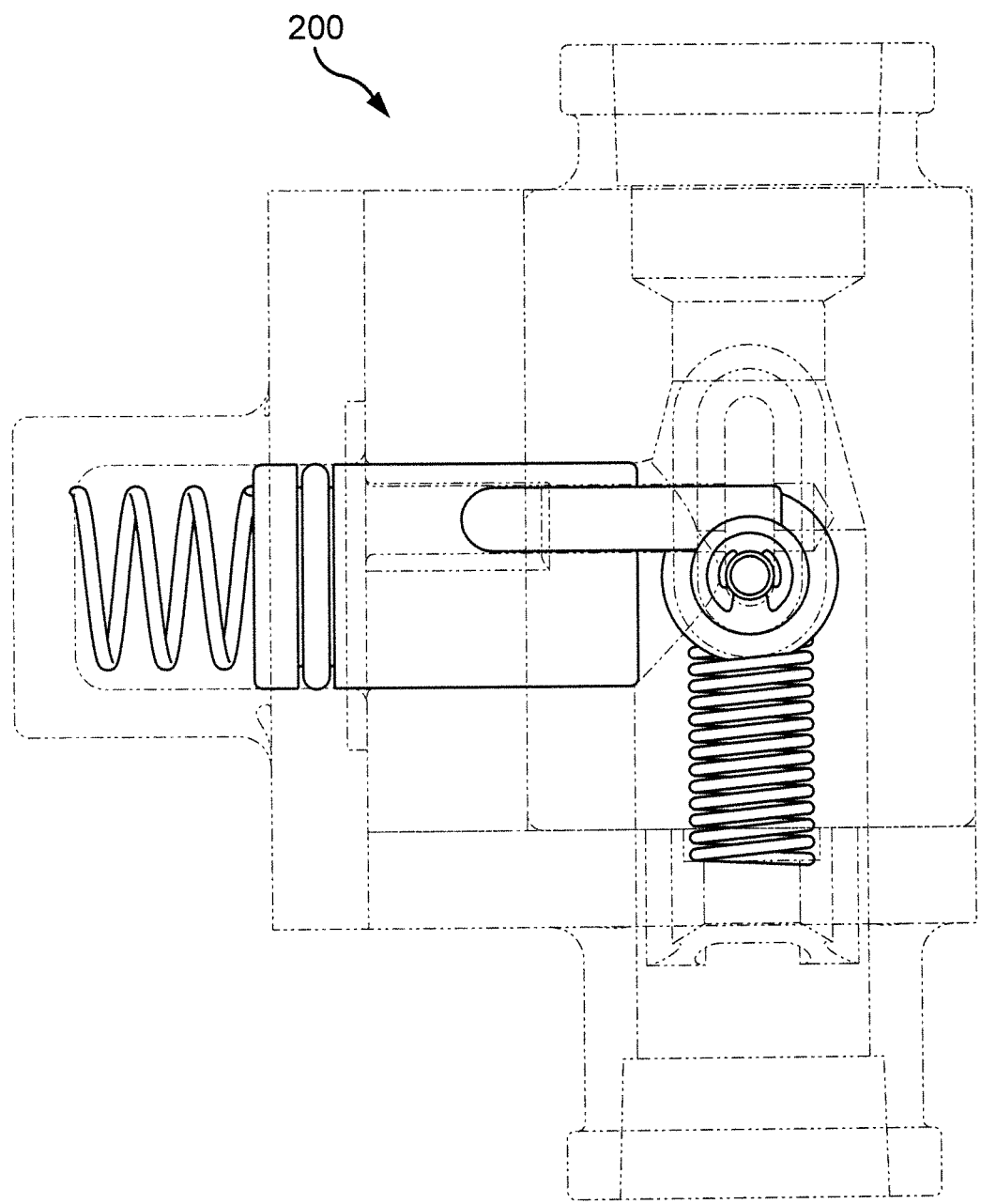
Figure 9C:
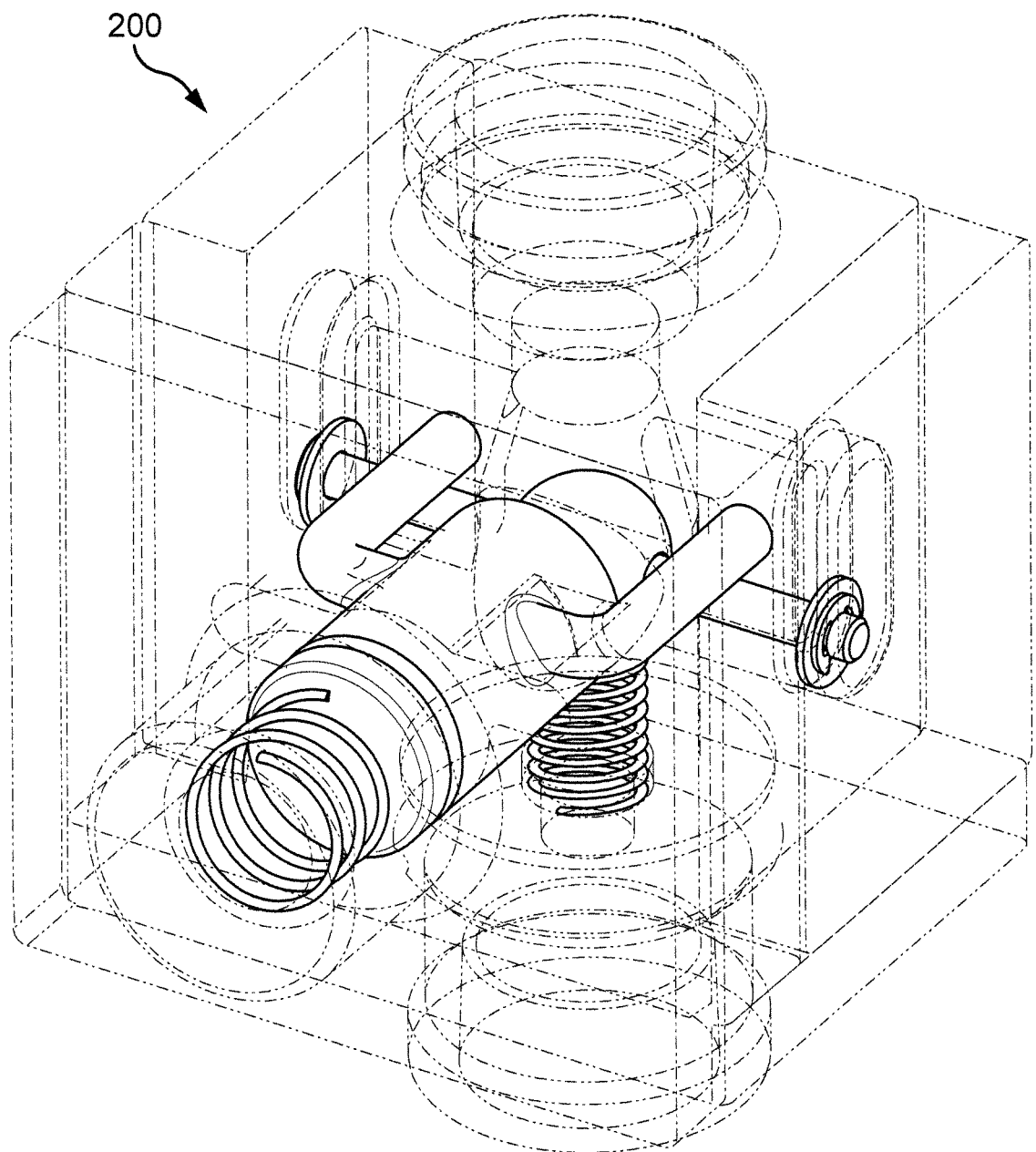
Figure 10A:
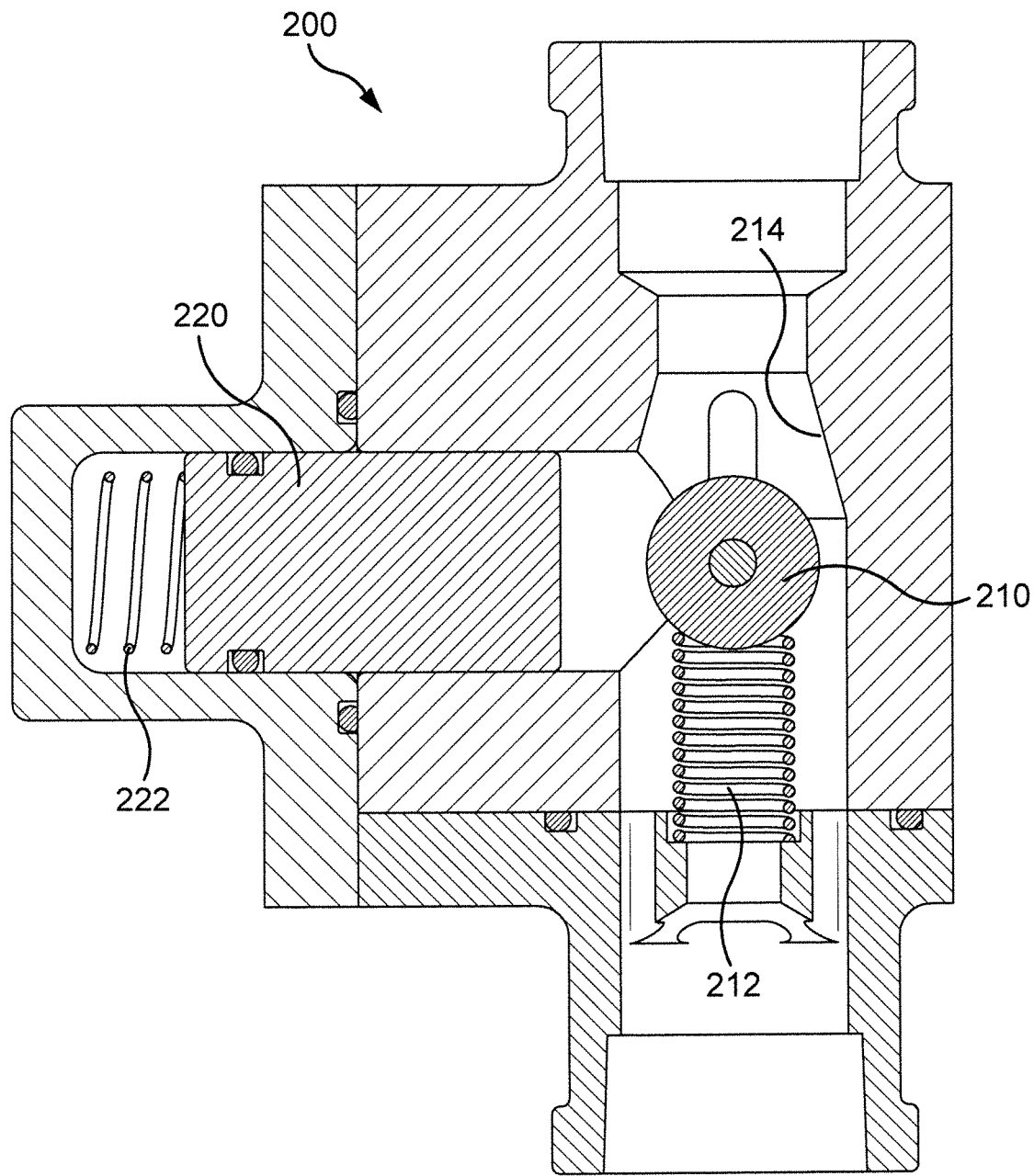
FIGS. 10A-C show cross-sectional and phantom views of the inline device according to the embodiment of FIG. 7, in an overpressure intermediate position.
Figure 10B:
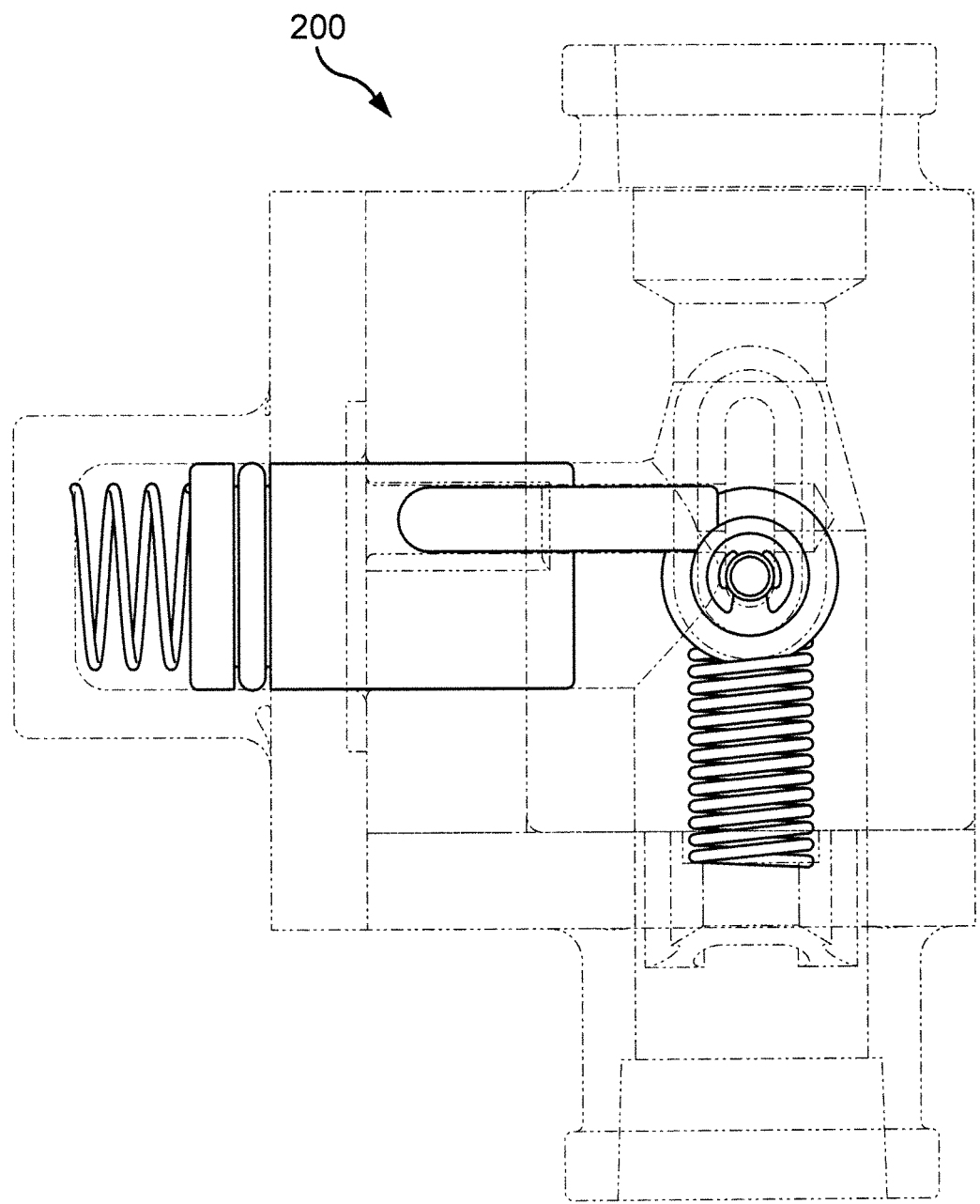
Figure 10C:
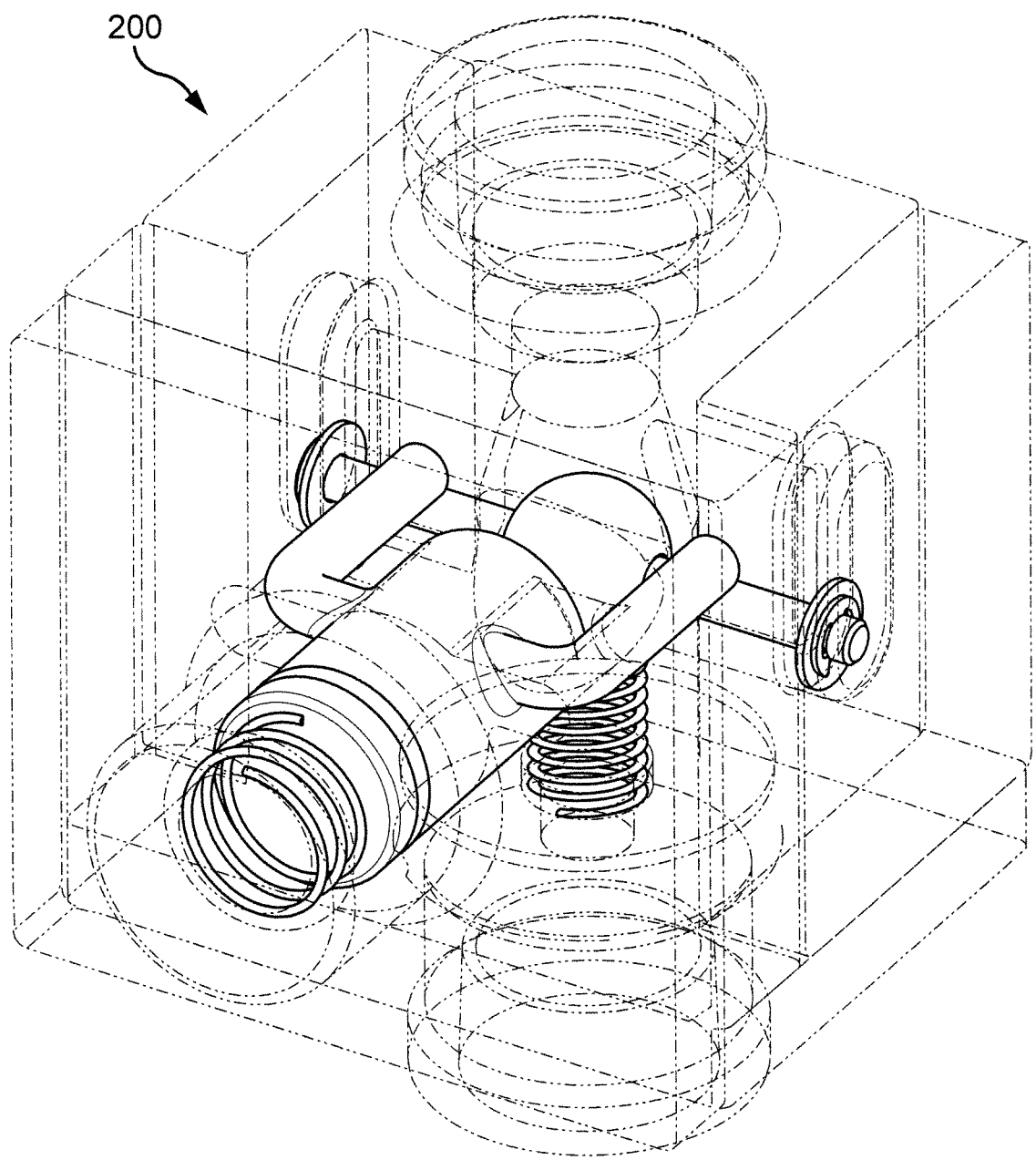
Figure 11A:
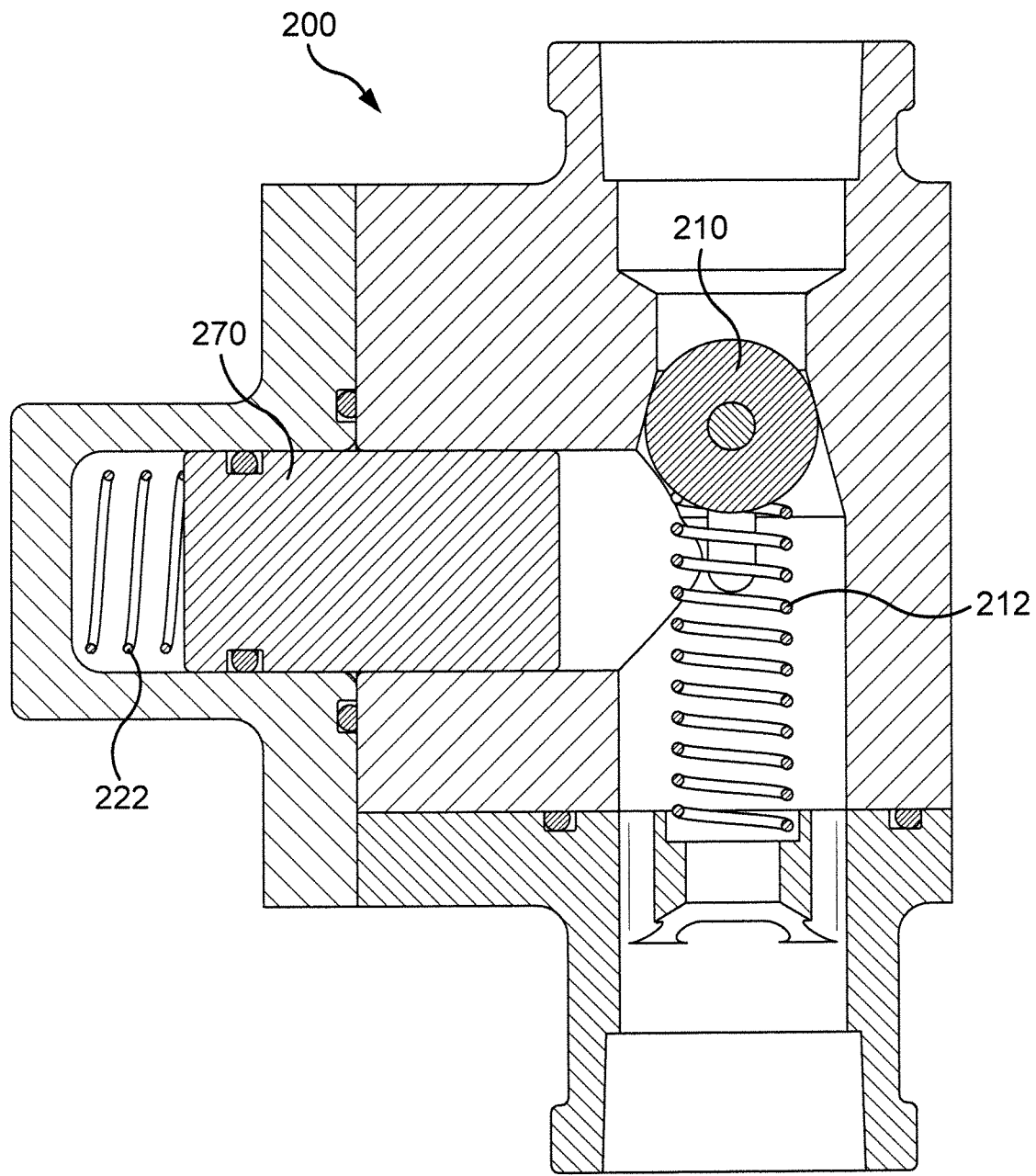
FIGS. 11A-C show cross-sectional and phantom views of the inline device according to the embodiment of FIG. 7, in a closed position.
Figure 11B:
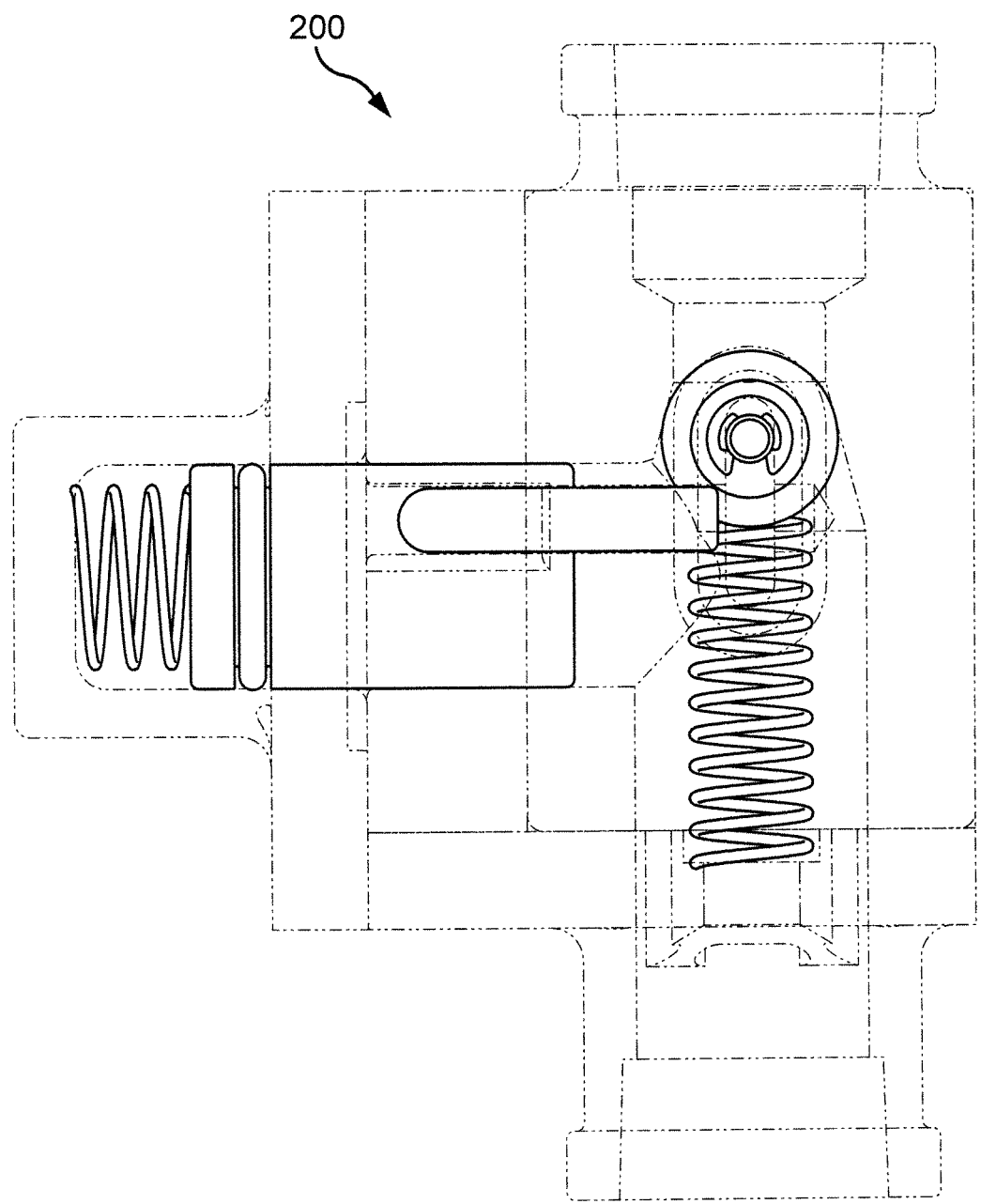
Figure 11C:
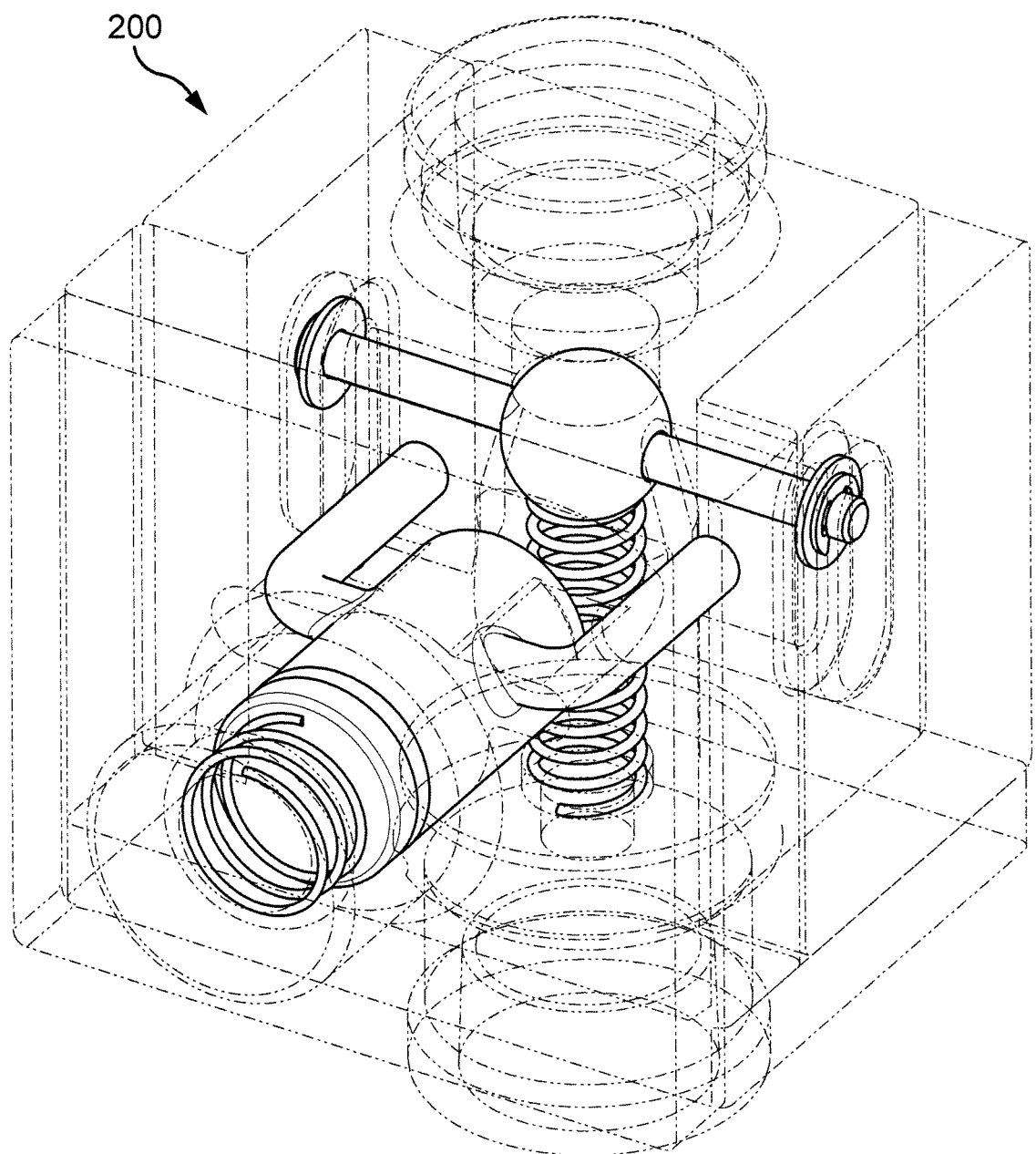

FIGS. 7-11 show an embodiment of the invention where the inline device 200 is consumable. Rather than use an external lever to reset the device, an operator would need to disassemble the device in order to access the inner lever components to reset the device. Device 200 includes a ball seal 210 with longitudinal spring 212, and a locking element 220 with lateral spring 222. Pins 232 extend into sides of the ball seal 210 and provide a surface for arms 226 to secure the ball seal 210 in the open position. The pins 232 travel in grooves 207 in the inner housing 204, covered by sealed side panels 242. FIGS. 9-11 show the movement of the locking element 220 and the ball seal 210 into seat 214n an overpressure event.

Similar to the earlier embodiment, the housing 202 includes an internal passage housing 240, and side panels 242 for attaching, securing, and covering components of the release mechanism. A bottom panel 244 includes a spring seat 246. Sealing rings 245 extend around or between components to seal in the fluid in the pipeline.

Figure 12A:
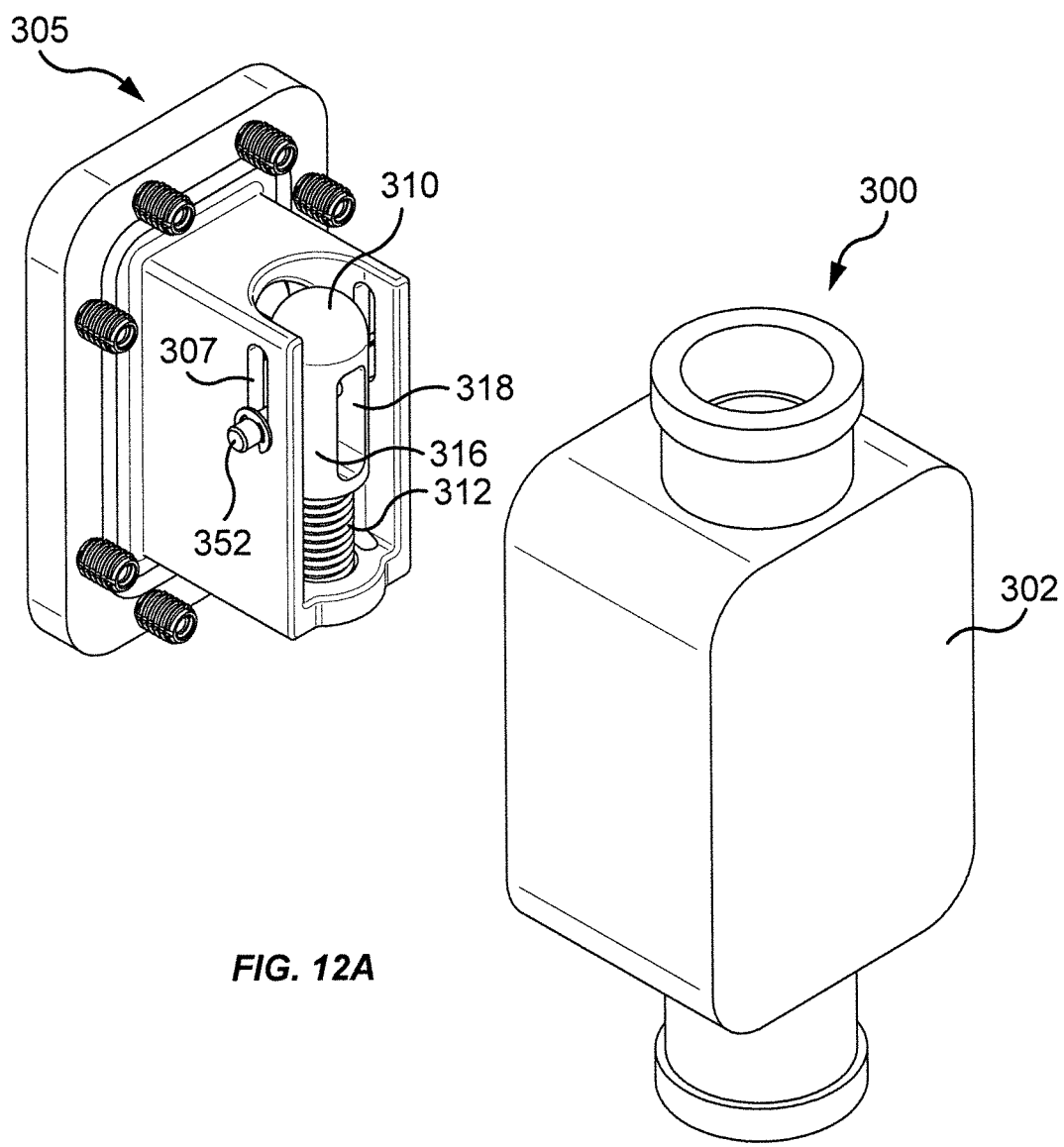
FIGS. 12A-B show perspective views of an inline device with a removable cartridge of the moving components, according to one embodiment of the invention.
Figure 12B:
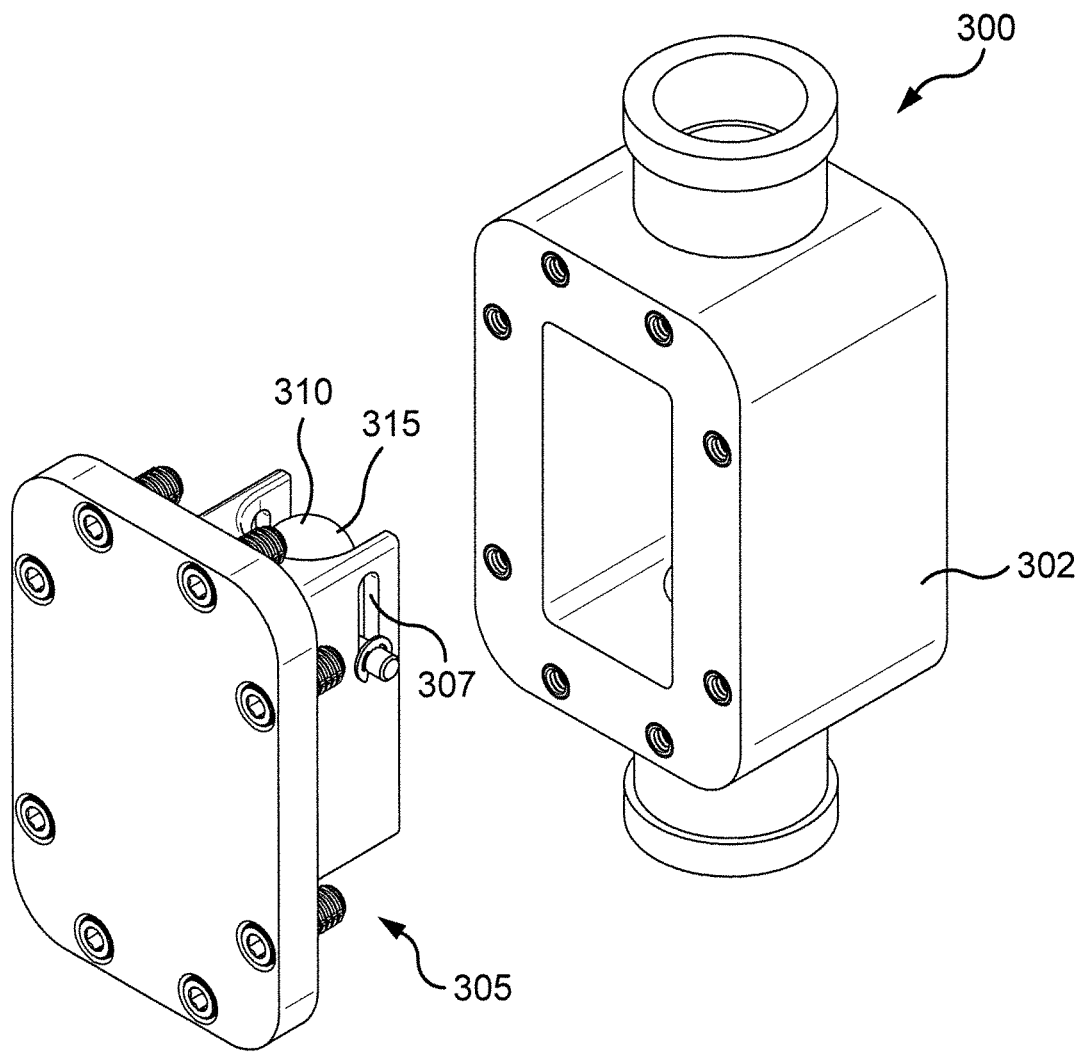
Figure 13A:
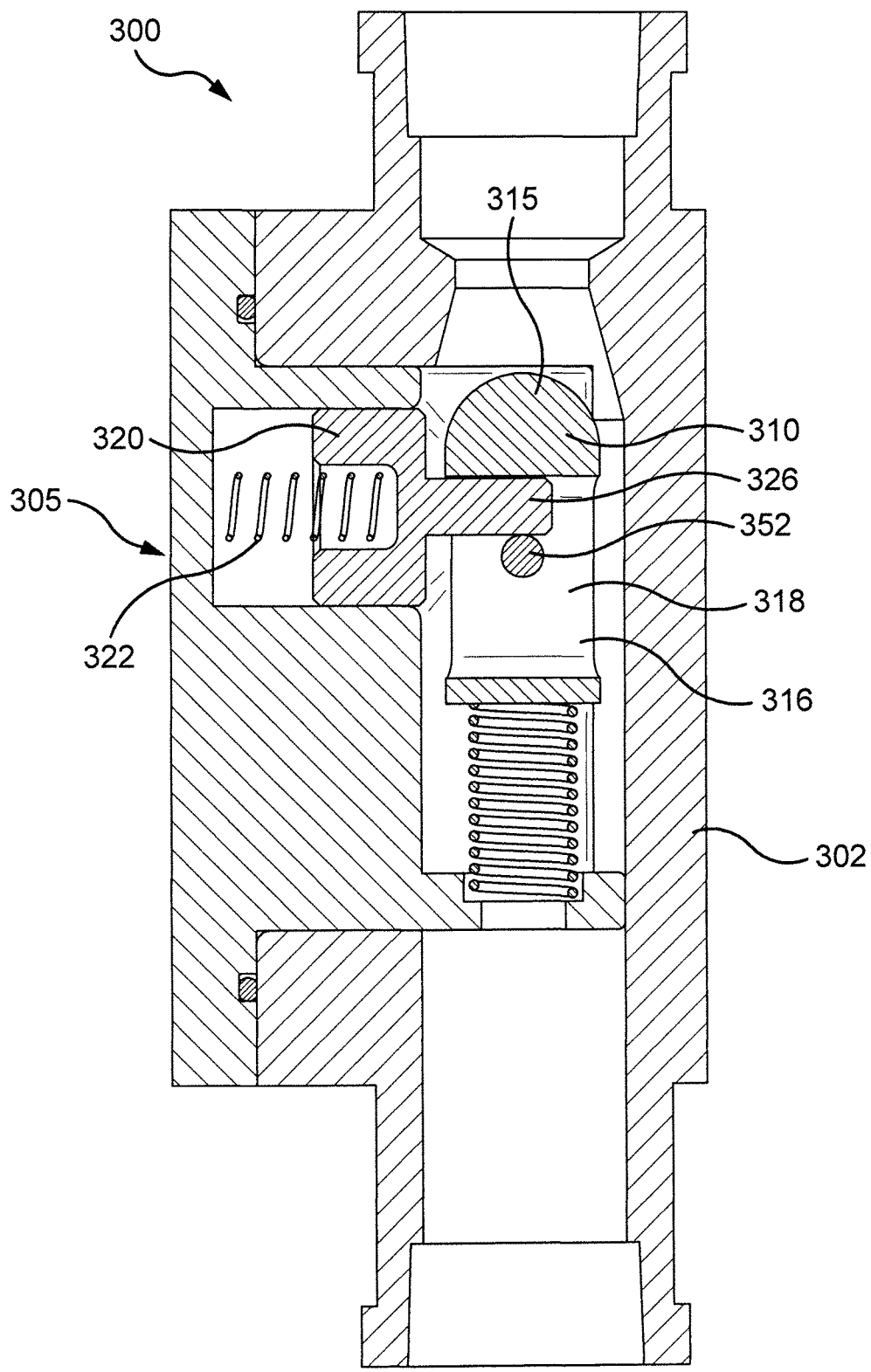
FIG. 13A is a sectional view of the device of FIGS. 12A-B in an open operational position.
Figure 13B:
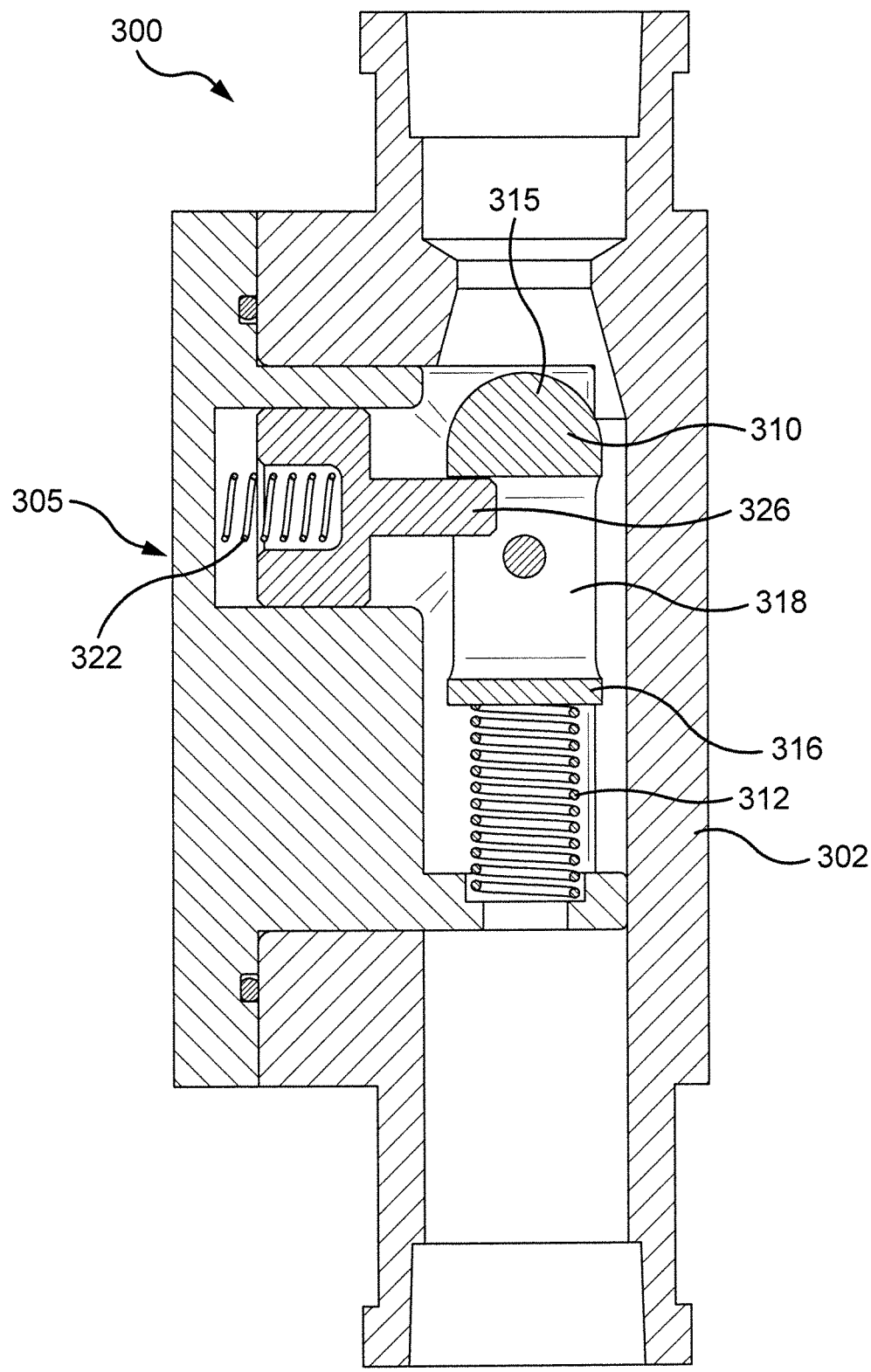
FIG. 13B is a sectional view of the device of FIGS. 12A-B in an intermediate overpressure operational position.
Figure 13C:
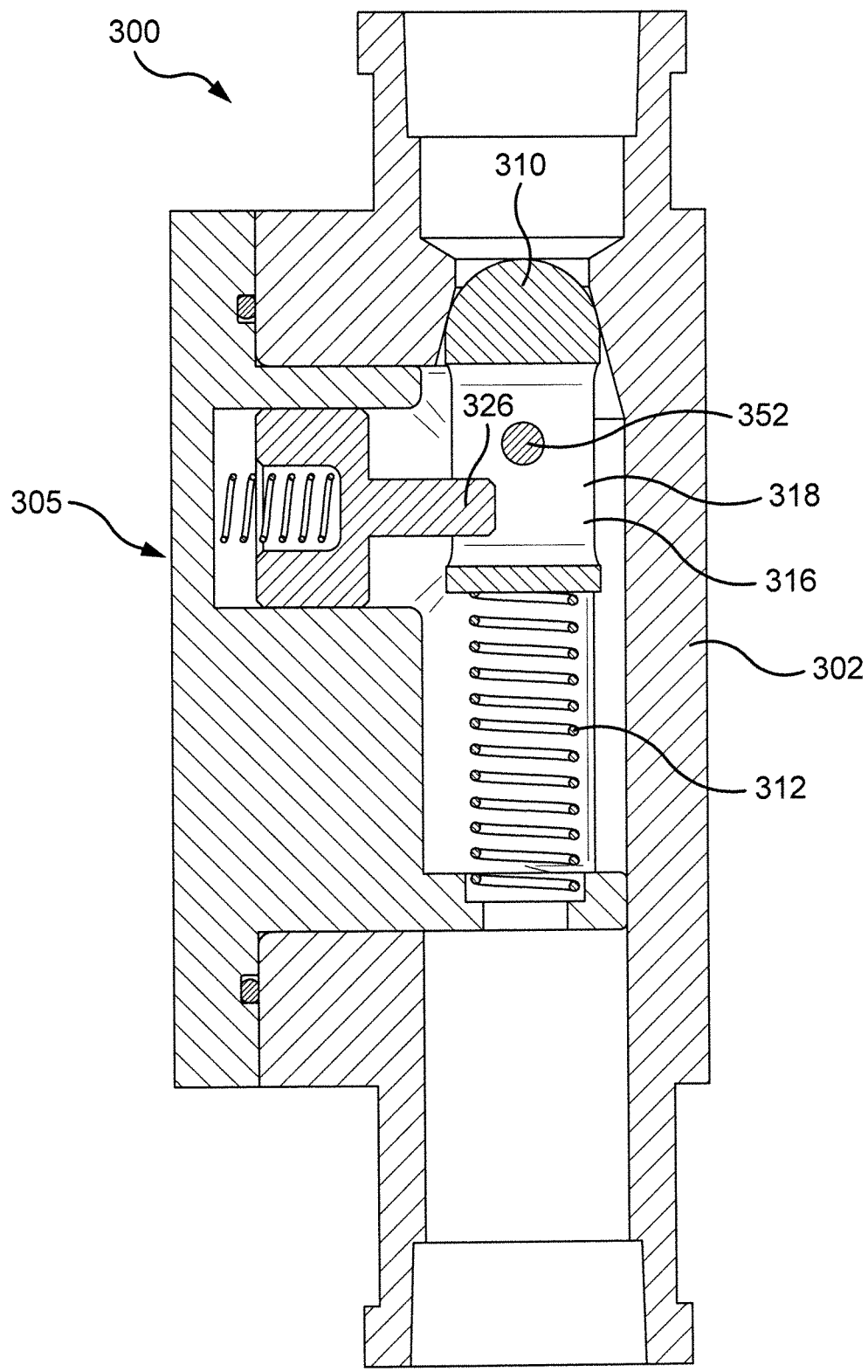
FIG. 13C is a sectional view of the device of FIGS. 12A-B in a closed operational position.

FIGS. 12-13 show an inline device 300 that includes a cartridge assembly 305. The cartridge 305 fits into the device housing 302. The cartridge 305 includes the sealing member 310, the longitudinal spring 312, and the locking element 320 and lateral spring 322. In this embodiment, the sealing member includes a ball seal surface 315 atop a longitudinally extending cylinder 316. The cylinder includes a central slot 318. A shaft 352 extends through the cylinder 316 and across slot 318, and also secures the sealing member 310 within the cartridge by attachment to slots 307 on the cartridge 305. A single arm 326 of the locking element 320 extends into the slot 318 and over the shaft 352. Overpressure pushes the locking element off the shaft 352. Once the over-pressurization is reduced, the cartridge 305 can be removed and reset, or replaced with new cartridge for a further use. The cartridge may also include a push button on an outer side of the cartridge. The push button may signify to the user that pressure passing through the device is in excess.

Figure 14B:
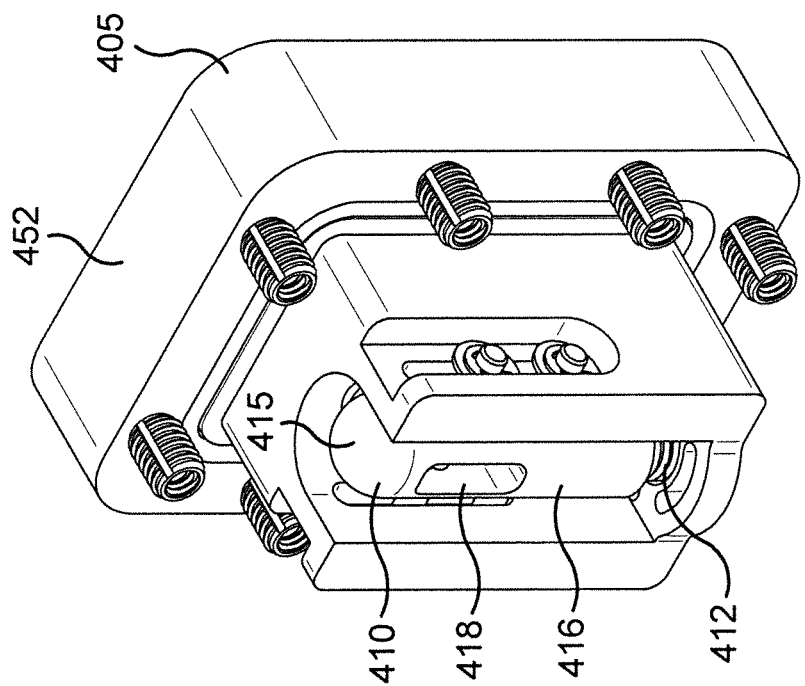
FIGS. 14A-B show perspective views of an inline device with a removable cartridge of the moving components, according to one embodiment of the invention.
Figure 14A:
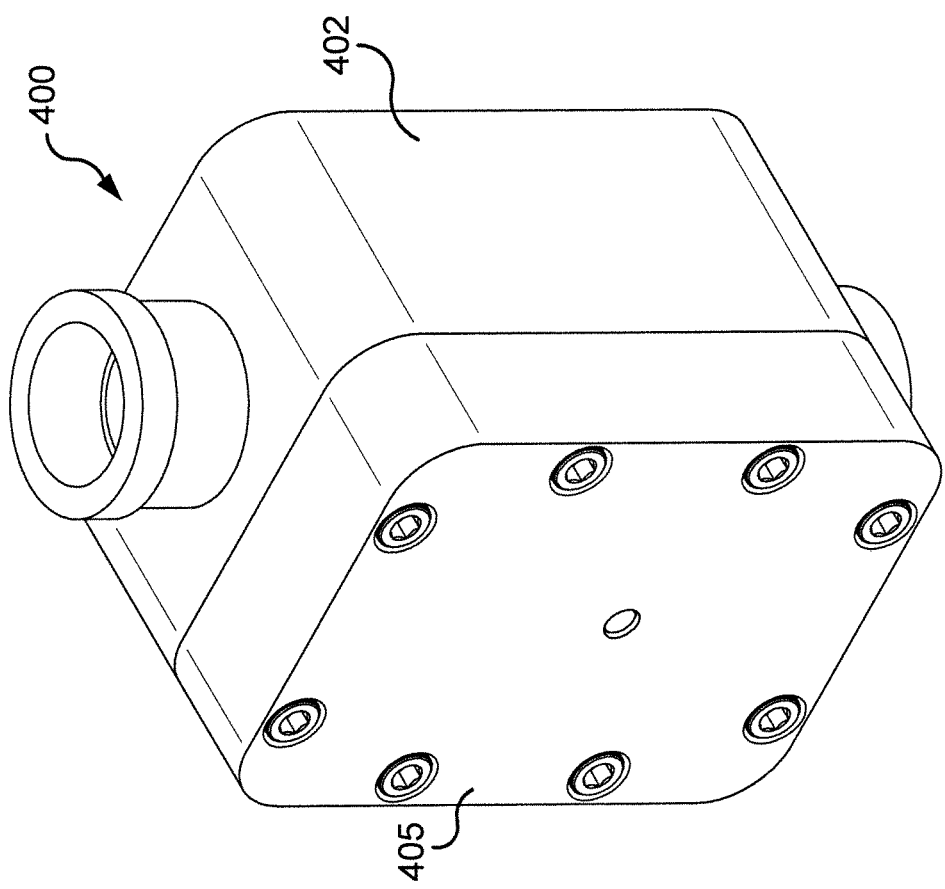
Figure 15B:
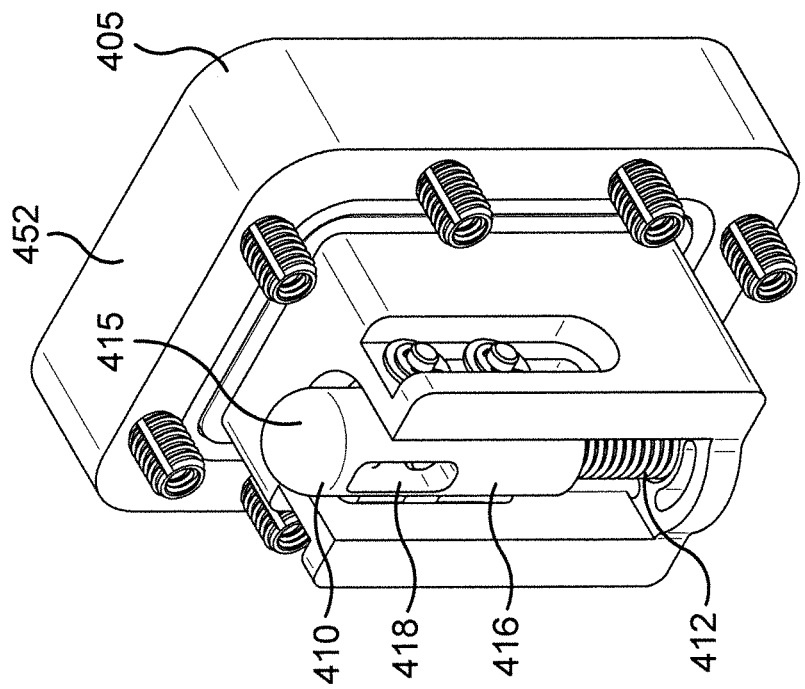
FIGS. 15A-B shows the device of FIGS. 14A-B in a closed operational position.
Figure 15A:
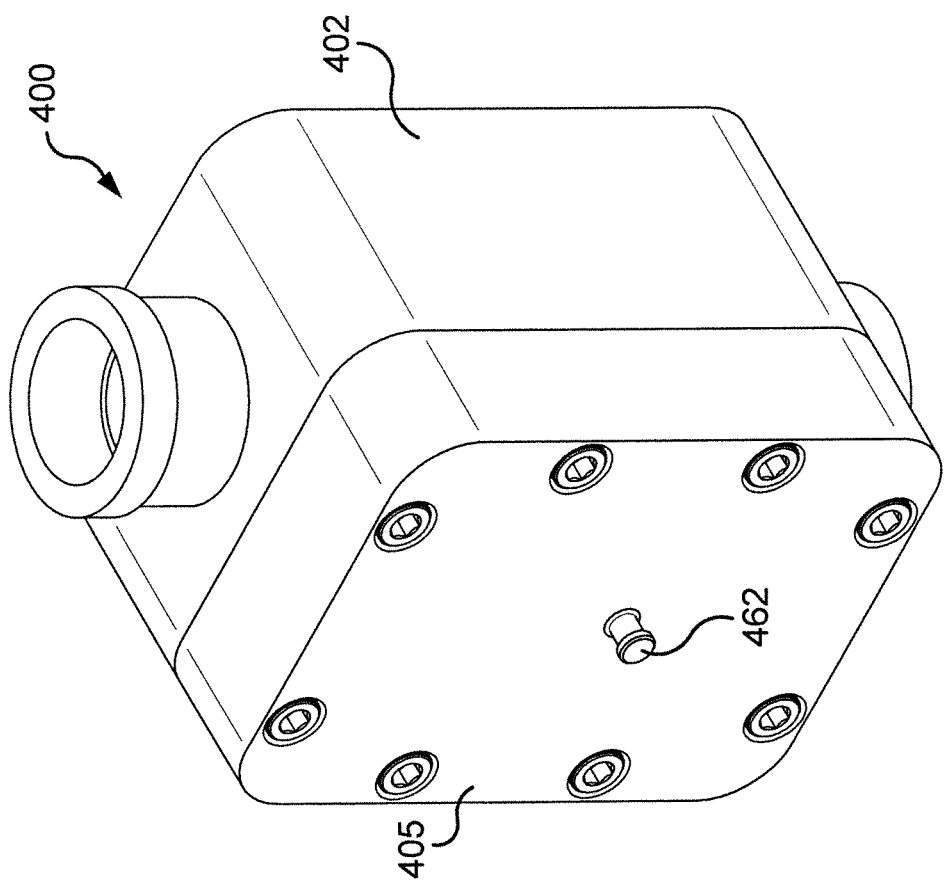
Figure 16A:
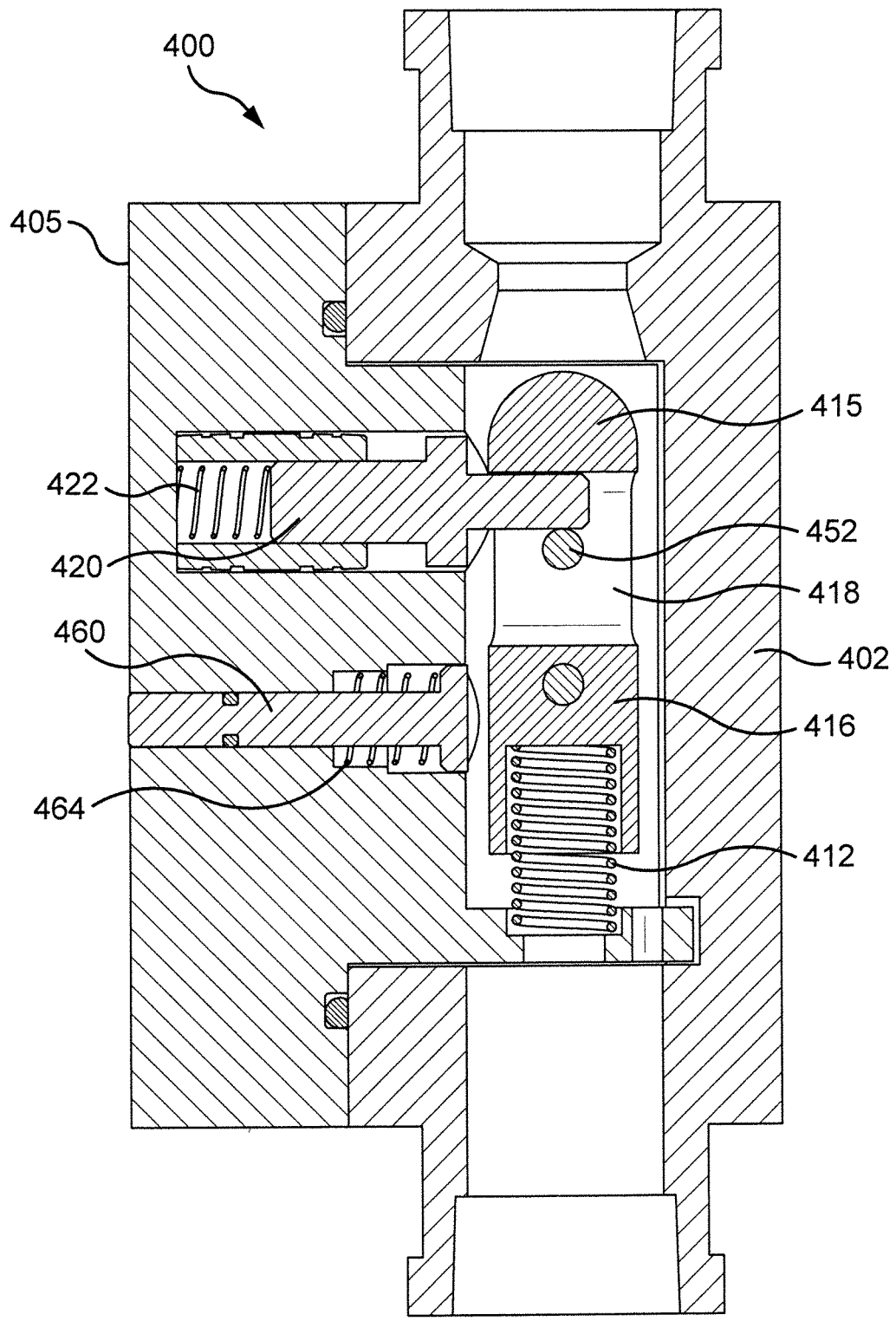
FIG. 16A is a sectional view of the device of FIGS. 14A-B in an open operational position.
Figure 16B:
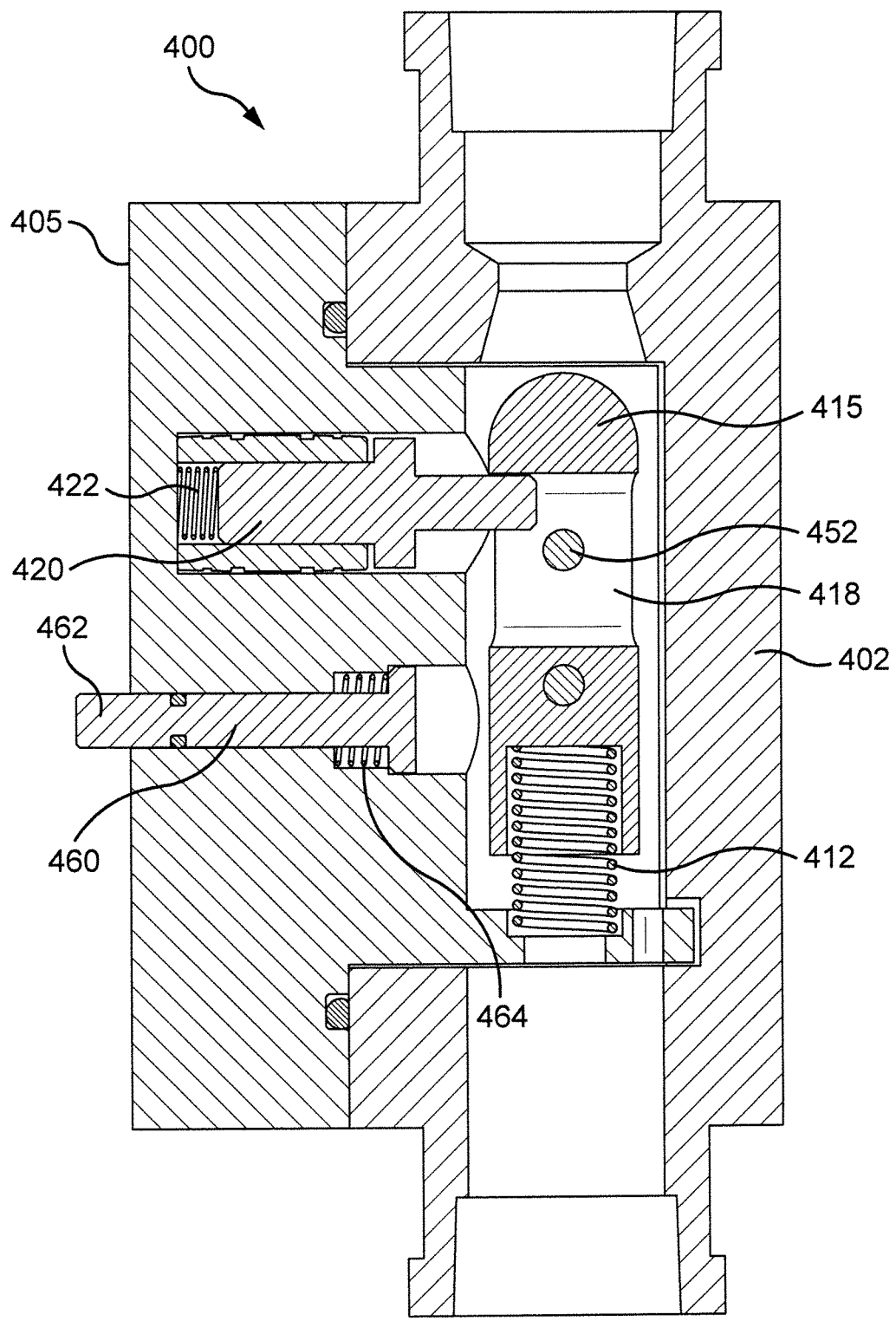
FIG. 16B is a sectional view of the device of FIGS. 14A-B in an intermediate overpressure operational position.
Figure 16C:
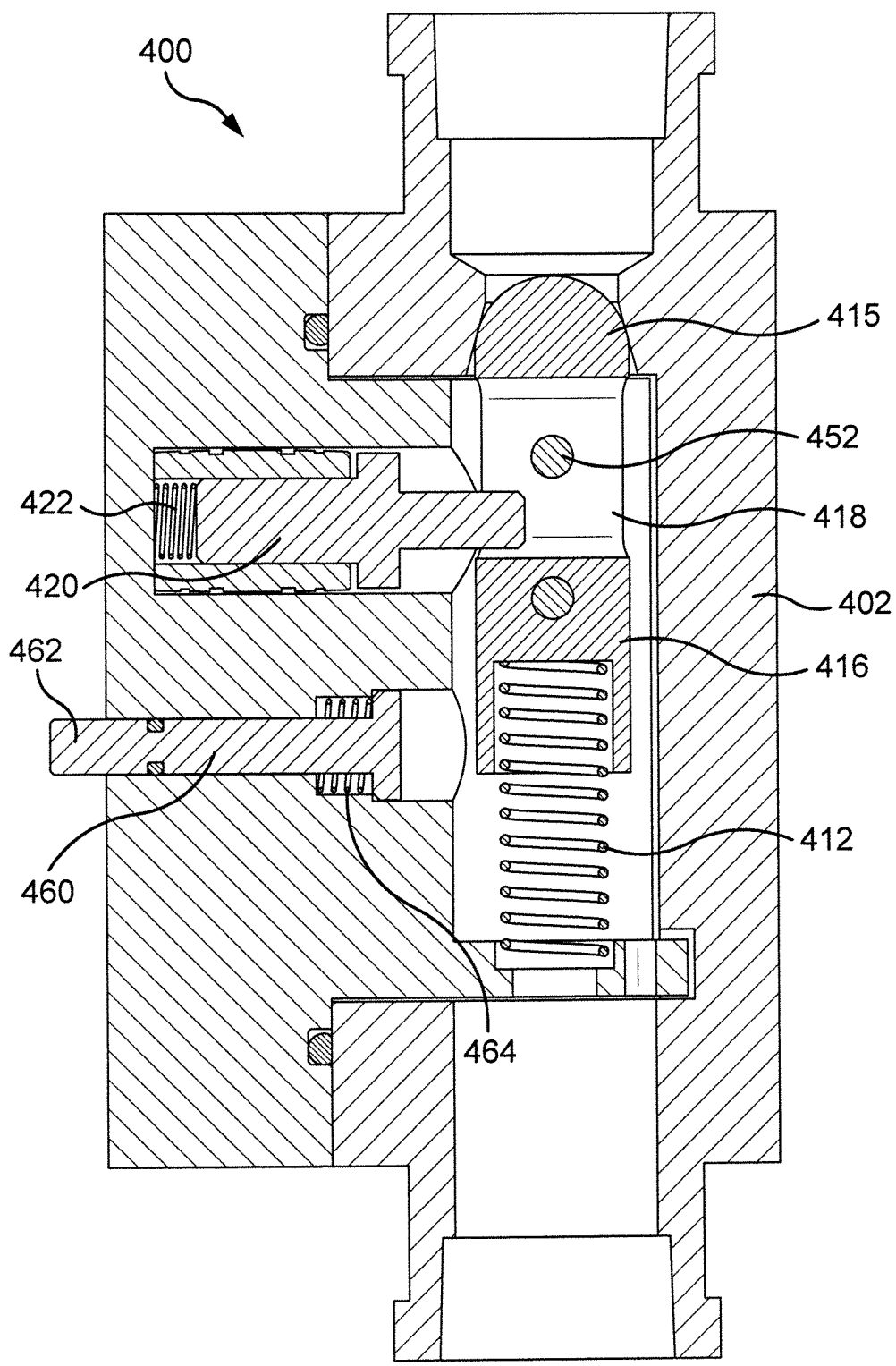
FIG. 16C is a sectional view of the device of FIGS. 14A-B in a closed operational position.

FIGS. 14-16 show an inline device 400 that includes a cartridge assembly 405 according to another embodiment of this invention. The cartridge 405 fits into the device housing 402. The cartridge 405 includes a sealing member 410, a longitudinal spring 412, and a locking element 420 and lateral spring 422. In this embodiment, the sealing member includes a ball seal surface 415 atop a longitudinally extending cylinder 416. The cylinder 416 includes a central slot 418. A shaft 452 extends through the cylinder 416 and across slot 418, and also secures the sealing member 410 within the cartridge by attachment to slots 407 on the cartridge 405. A single arm 426 of the locking element 420 extends into the slot 418 and over the shaft 452. The device 400 further includes a spring loaded indicator pin 460. Overpressure pushes the indicator pin 460 into the cartridge 405, against spring 464, such that an end 462 of the indicator pin 460 extends out of the cartridge 405, such as shown in FIGS. 15A and 16B-C. Overpressure also pushes the locking element off the shaft 452. Once the over-pressurization is reduced, the indicator pin 460 will return to the position in FIGS. 14A and 16A, externally showing that the overpressure is no longer present. The cartridge 405 can be removed and reset, or replaced with new cartridge for a further use.

Figure 17B:
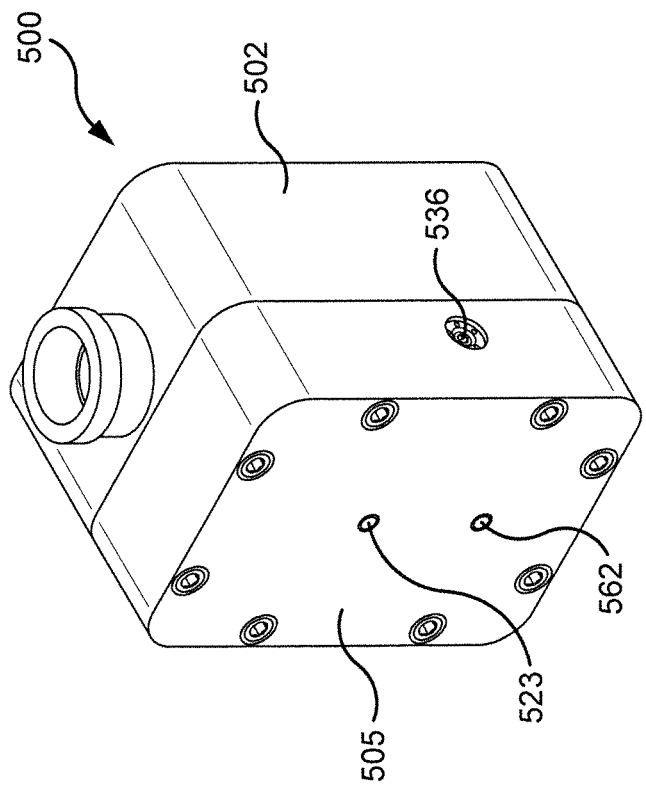
FIGS. 17A-D show views of an inline device with a resettable cartridge of the moving components, according to one embodiment of the invention.
Figure 17A:
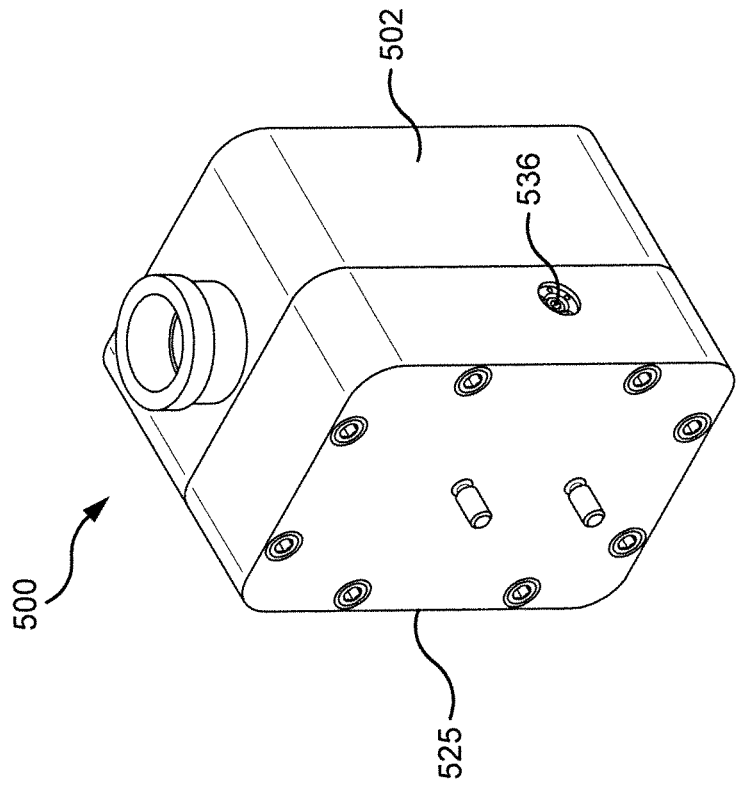
Figure 17D:
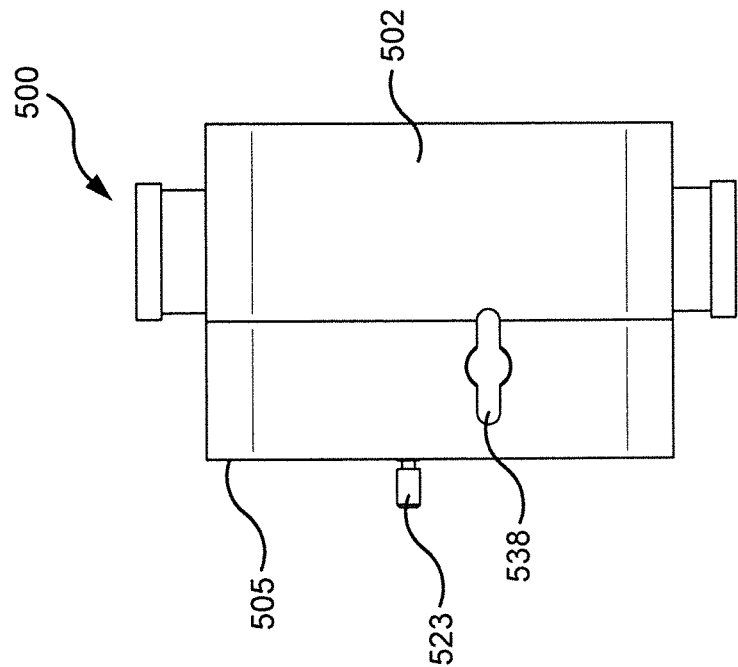
Figure 17C:
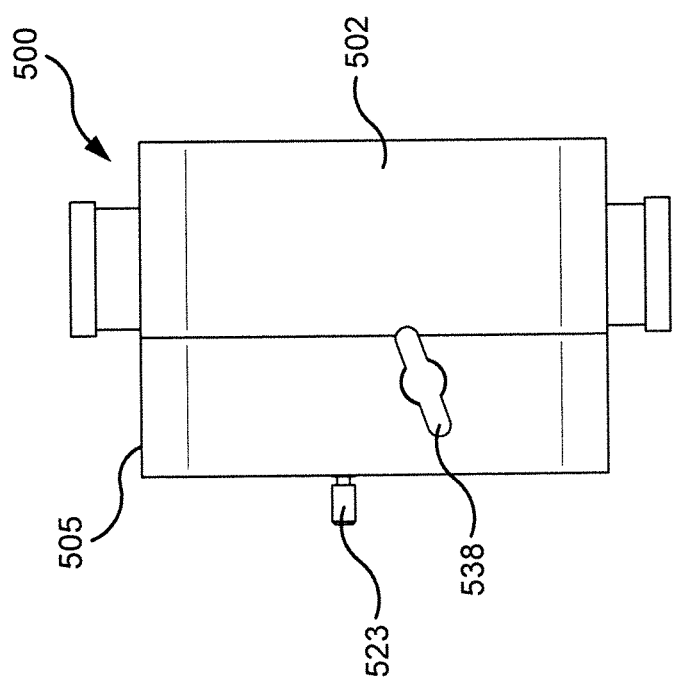
Figure 18A:
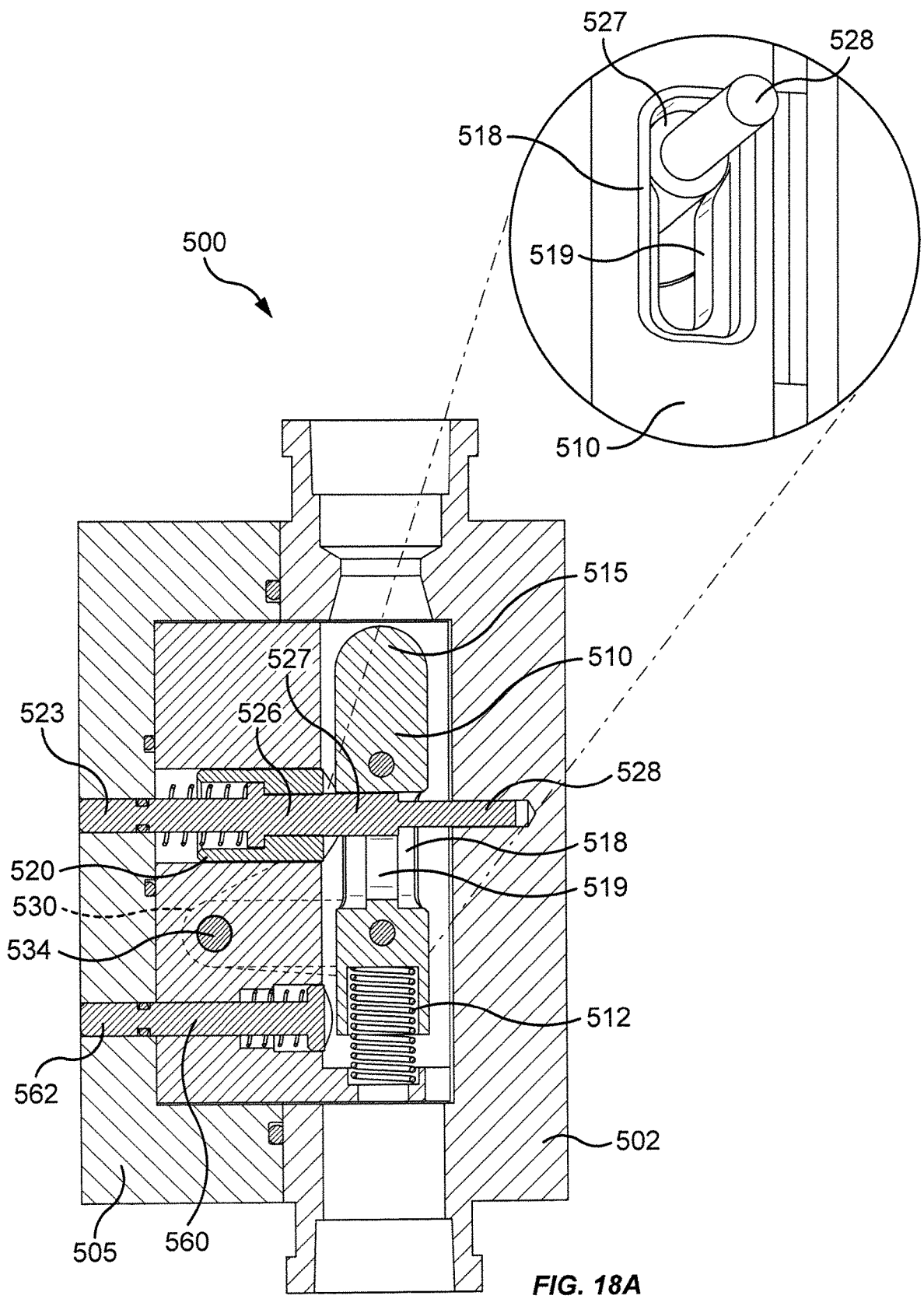
FIG. 18A is a sectional view of the device of FIGS. 17A-D in an open operational position.
Figure 18B:
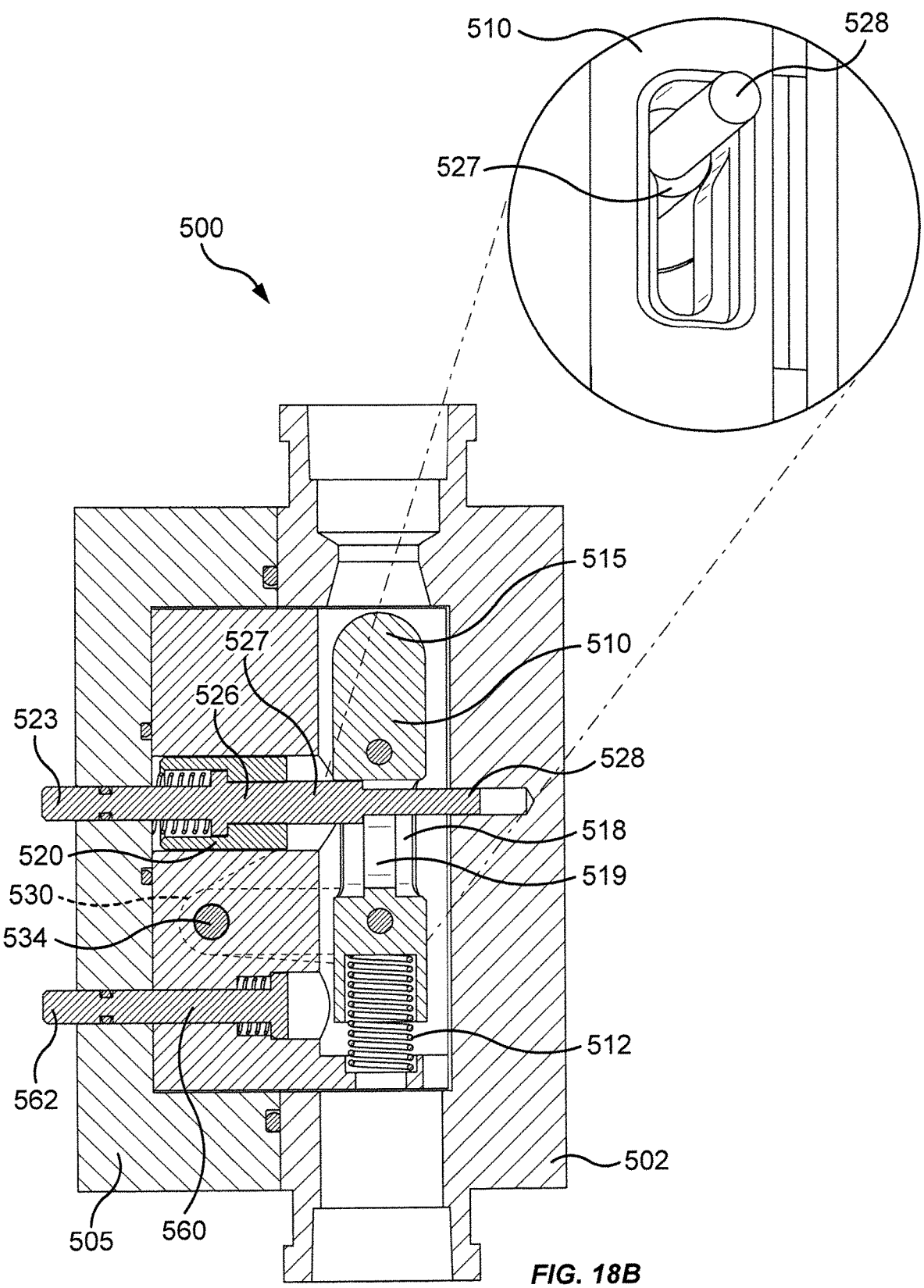
FIG. 18B is a sectional view of the device of FIGS. 17A-D in an intermediate overpressure operational position.
Figure 18C:
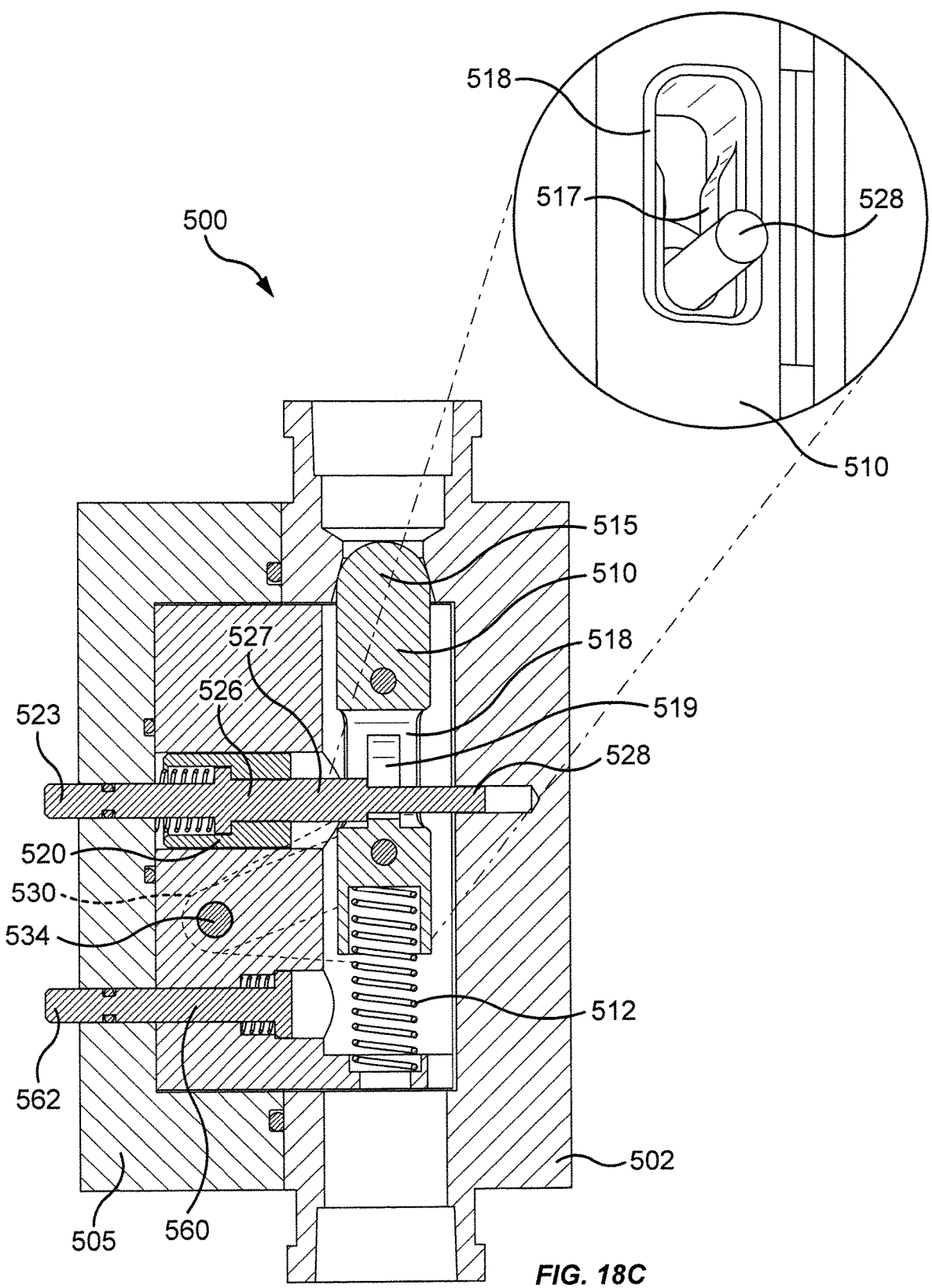
FIG. 18C is a sectional view of the device of FIGS. 17A-D in a closed operational position.

FIGS. 17-18 show a device 500, similar to device 400, but resettable without removal, according to embodiments of this invention. The cartridge 505 fits into the device housing 502. The cartridge 505 includes a sealing member 510, a longitudinal spring 512, and a locking element 520 and lateral spring 522. The sealing member 510 includes a ball seal surface 515 atop a longitudinally extending cylinder 516. The cylinder 516 includes a central slot 518. Shafts or pins 552 extend through or into the cylinder 516 to secure the sealing member 510 within the cartridge by attachment to slots (not shown) similar to FIGS. 12A and 14B. A single arm 526 of the locking element 520 extends into the slot 518. The arm 526 includes a wider portion 527 that holds the cylinder 516 in the open position as shown in FIG. 18A. As shown in FIG. 18B, when the arm 526 is moved due to overpressure, a narrow section 528 of arm 526 contacts a narrowed second slot 519 within slot 518. The sealing member 510 can then move into the closed position as shown in FIG. 18C.

One or more moveable arms 530 are connected to cylinder 516 (such as on opposing sides) by one or more pins 532 and to the cartridge 505 by rotation axis pin 534. When the cylinder 516 moves, the arms 530, one on either side of cylinder 516, move, rotating the rotation pin 534. One or more ends 536 of the rotation axis pin 534 are exposed on the sides of cartridge 505, and can be used to show the cylinder 516 has moved. A handle 538 or other tool can be used to return the sealing member 510 to the open position, allowing the arm 526 to move back to the position shown in FIG. 18A.

The device 500 includes a spring loaded indicator pin 560. Overpressure pushes the indicator pin 560 into the cartridge 505, such that an end 562 of the indicator pin 560 extends out of the cartridge 505, such as shown in FIGS. 17BA and 18B-C. An end 523 of the locking element 520 can also extend beyond the cartridge 505 to show the position of the locking element 520. Once the over-pressurization is reduced, the indicator pin 460 and end 562 will return to the position in FIG. 17C, and the handle 538 can be used to return the rotation pin 534 to the position shown in FIG. 17D, whereby the arm 526 wider portion 527 can automatically (via spring 522) move back into the slot 518, as shown in FIG. 18A, to secure the sealing member 510 in the open position. End 523 also returns into the cartridge 505, indicating the original position of FIG. 17A.

Figure 20A:
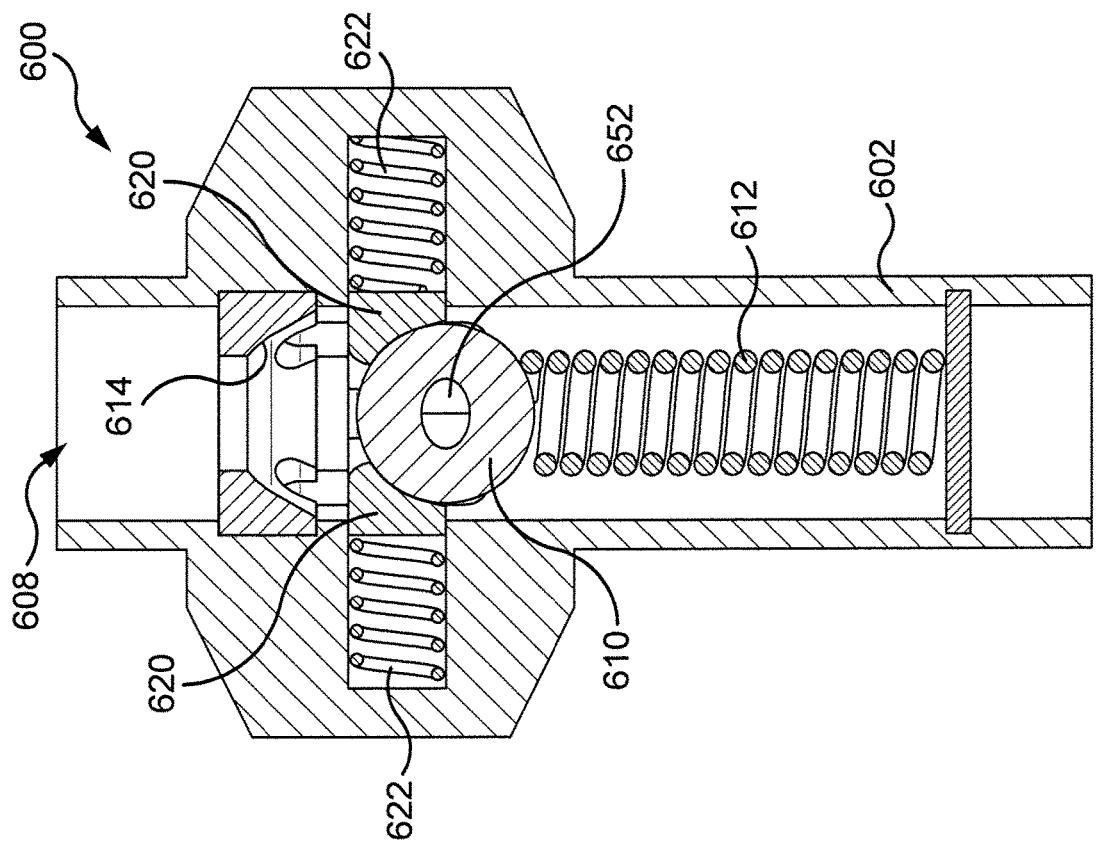
FIG. 20A is a sectional view of the device of FIG. 19 in an open operational position.
Figure 19:
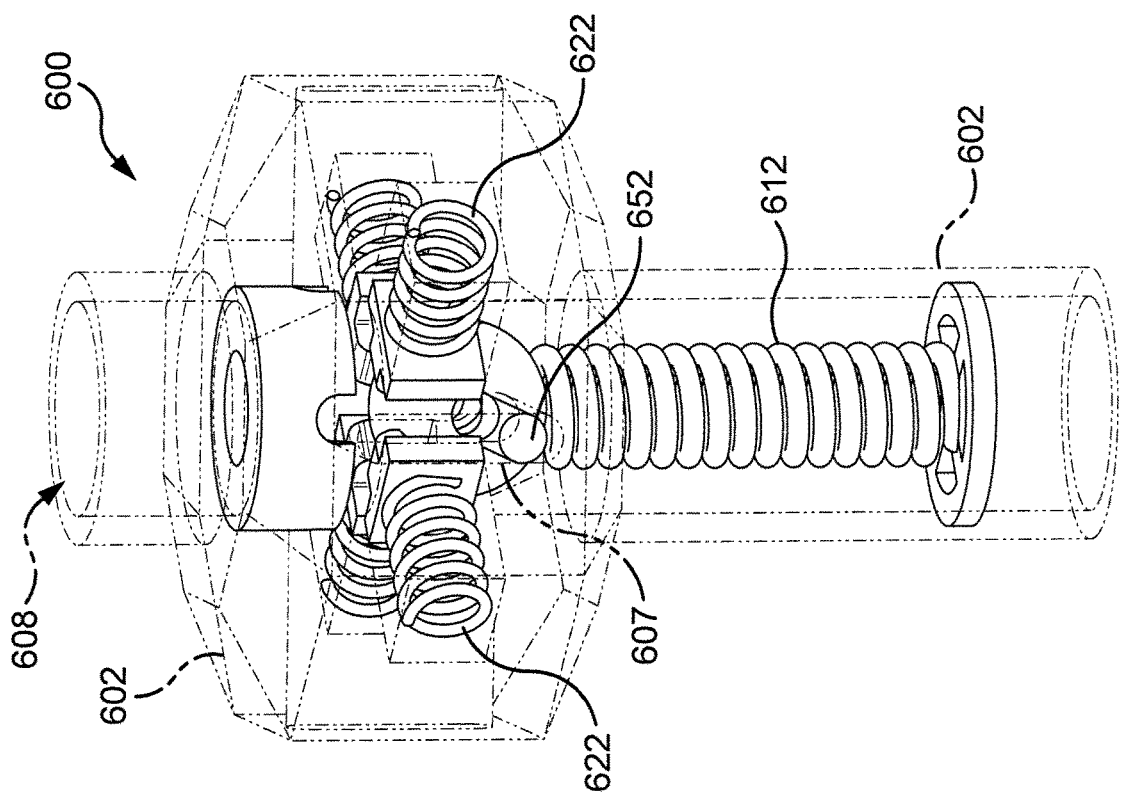
FIG. 19 is a phantom perspective view of an inline device, according to one embodiment of the invention.
Figure 20C:
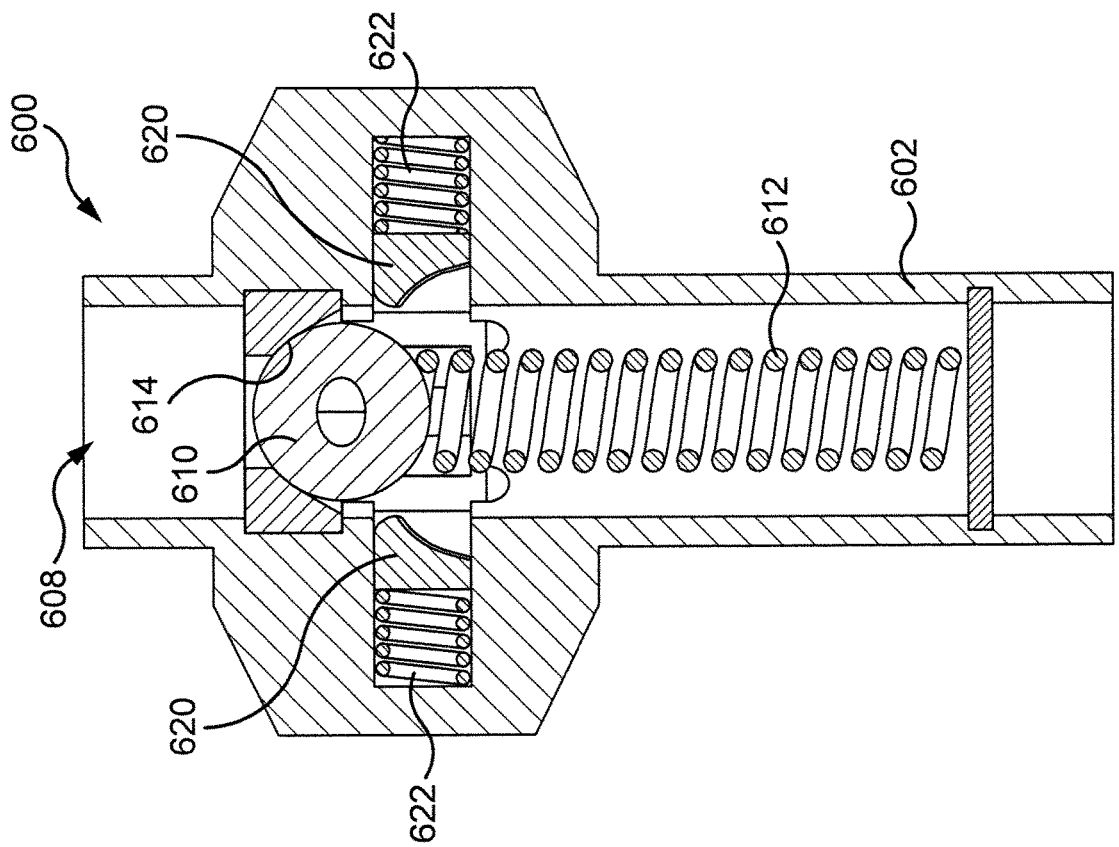
FIG. 20C is a sectional view of the device of FIG. 19 in a closed operational position.
Figure 20B:
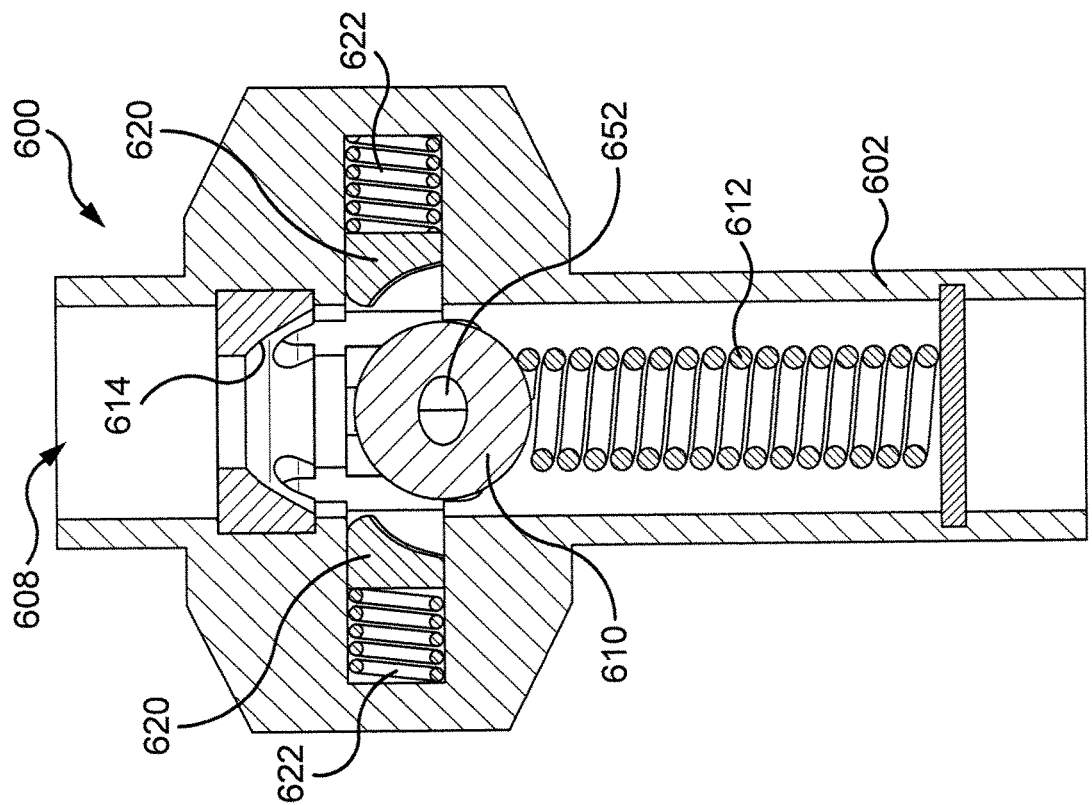
FIG. 20B is a sectional view of the device of FIG. 19 in an intermediate overpressure operational position.
Figure 21A:
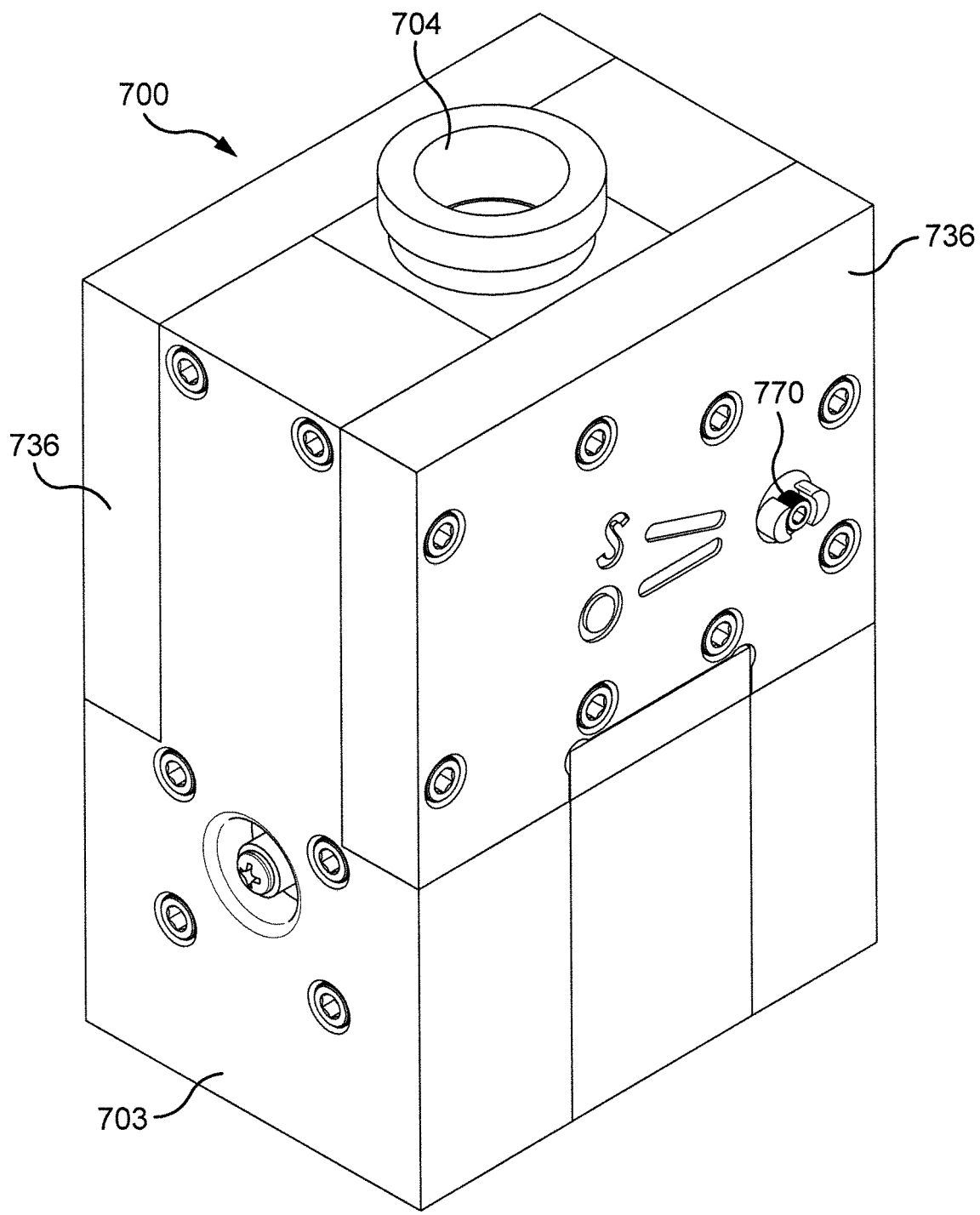
FIGS. 21A-B show perspective views of an inline device, according to one embodiment of the invention.
Figure 21B:
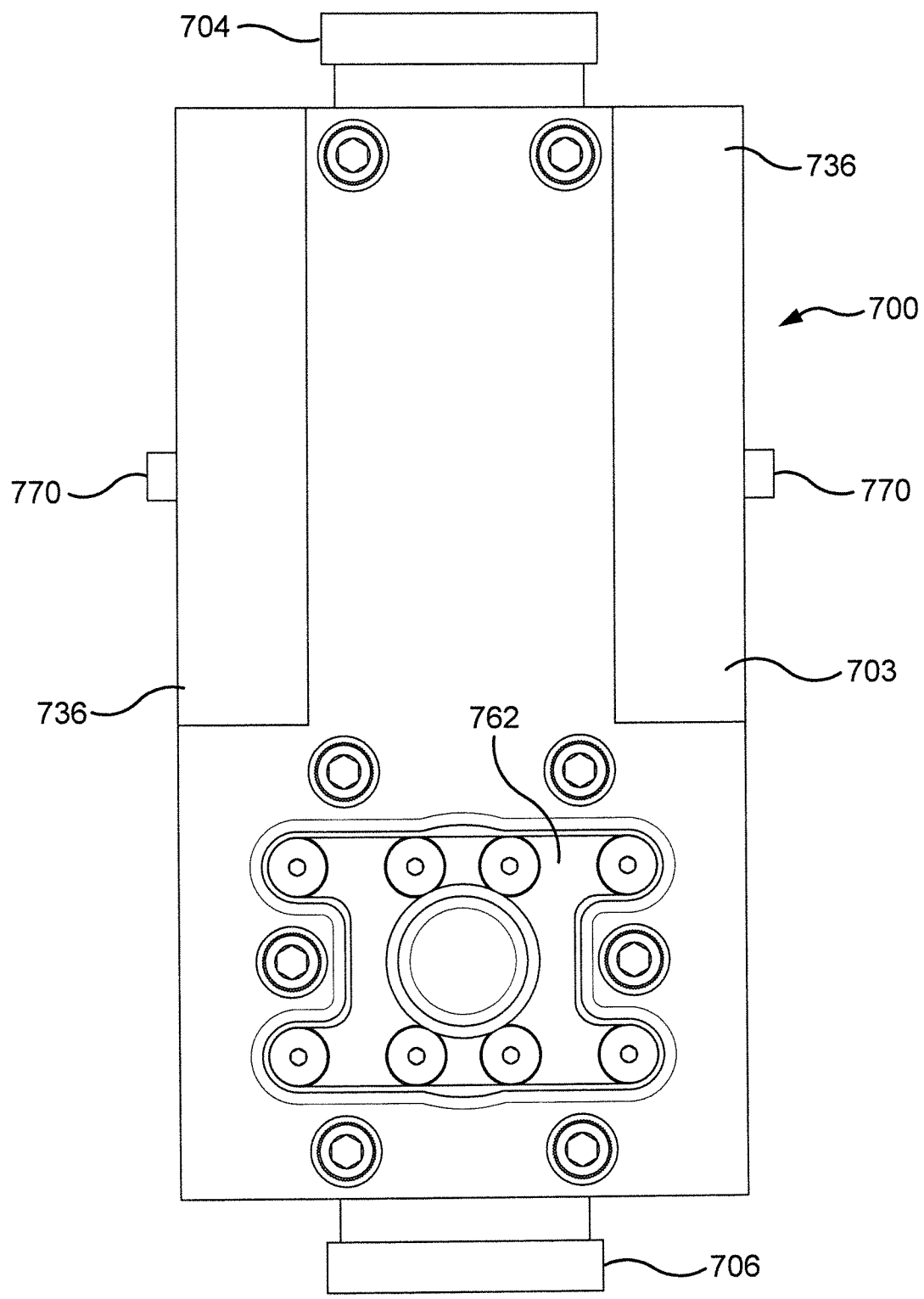
Figure 22:
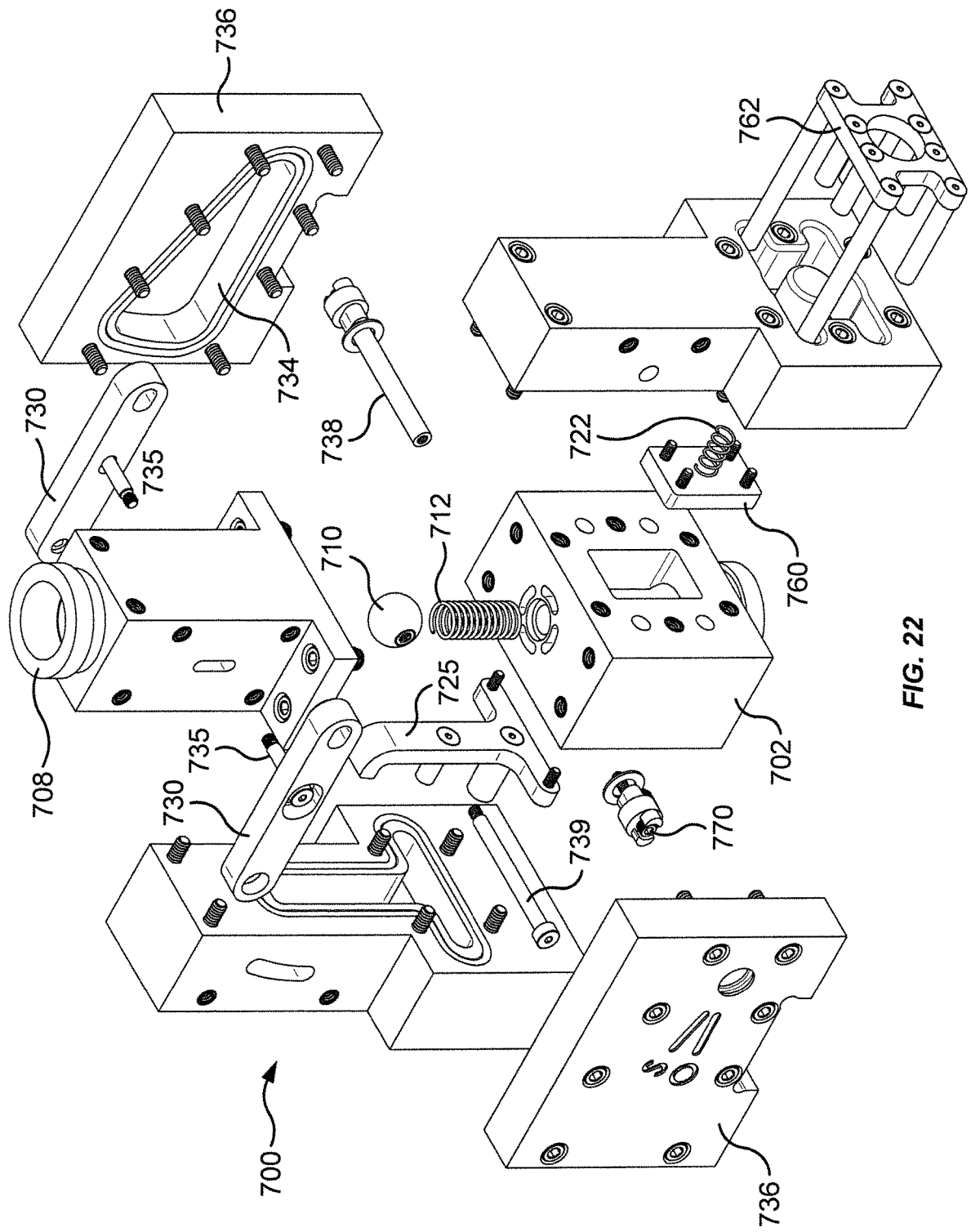
FIG. 22 is an exploded view of the device according to FIG. 21A-B.
Figure 23B:
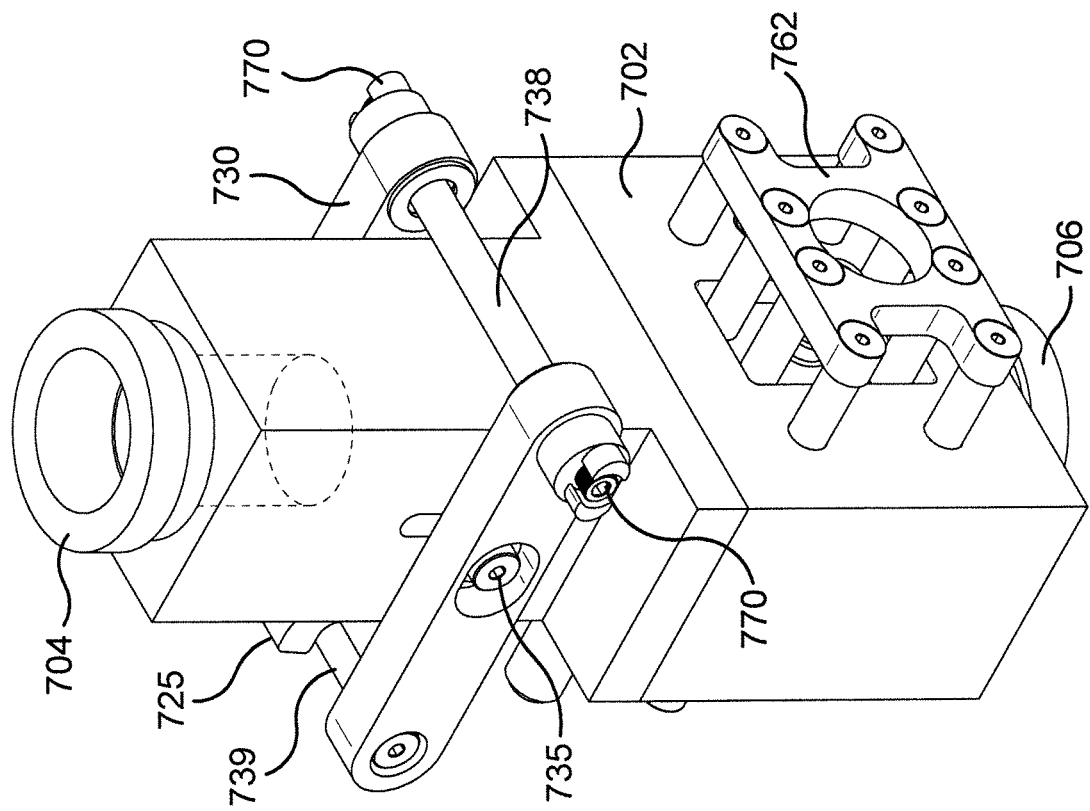
FIGS. 23A-B show internal components assembled, for the device according to FIGS. 21A-B.
Figure 23A:
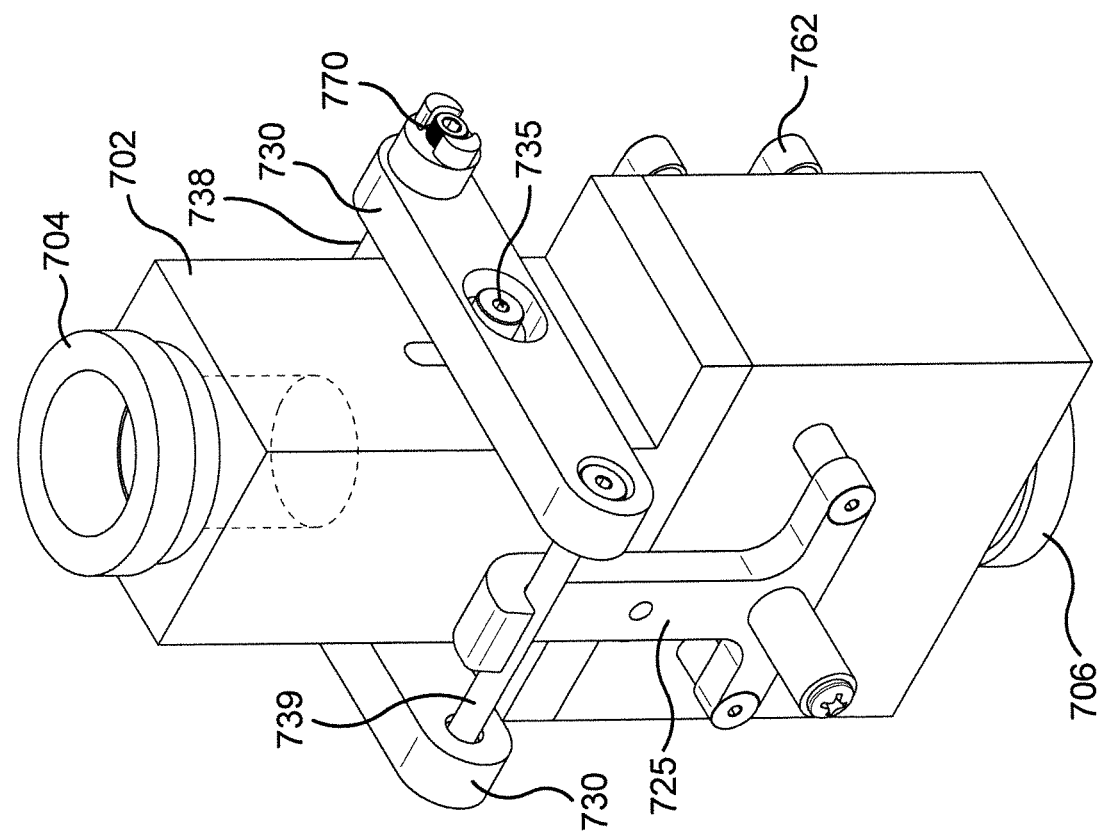
Figure 24A:
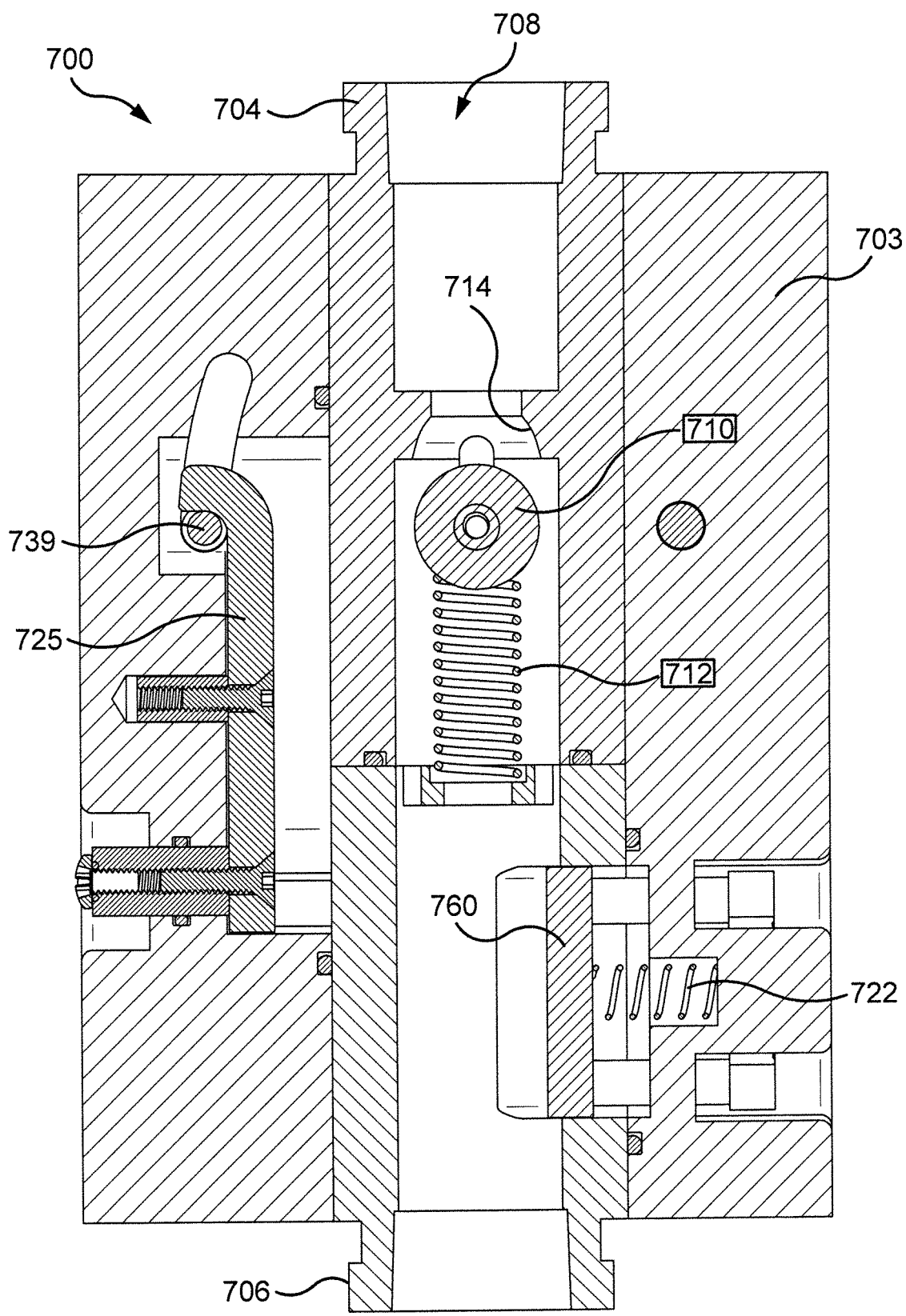
FIG. 24A shows a cross-sectional view of the inline device according to the embodiment of FIGS. 21A-B, in a neutral, open position.
Figure 24B:
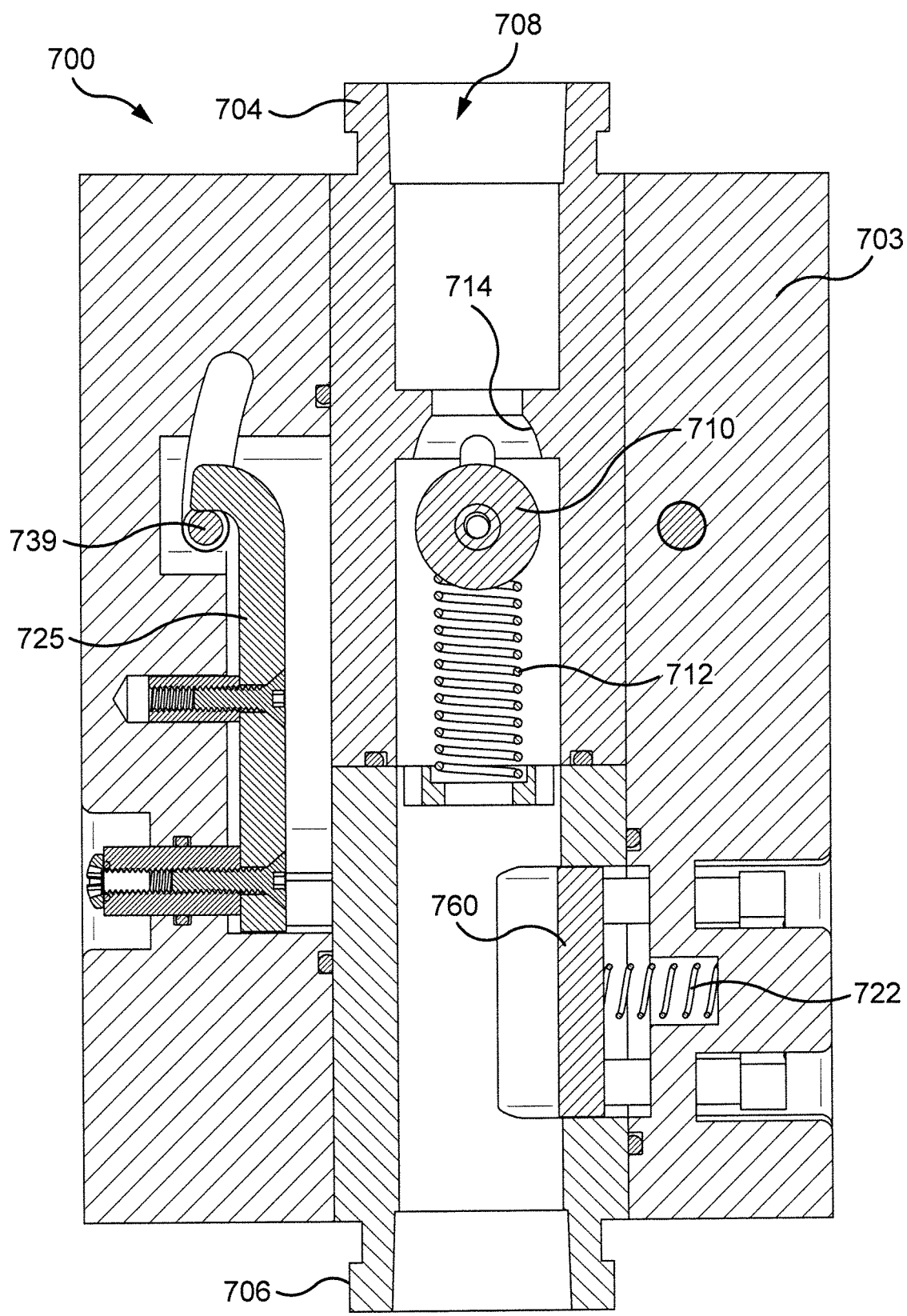
FIG. 24B shows a cross-sectional view of the inline device according to the embodiment of FIGS. 21A-B, in an intermediate position.
Figure 24C:
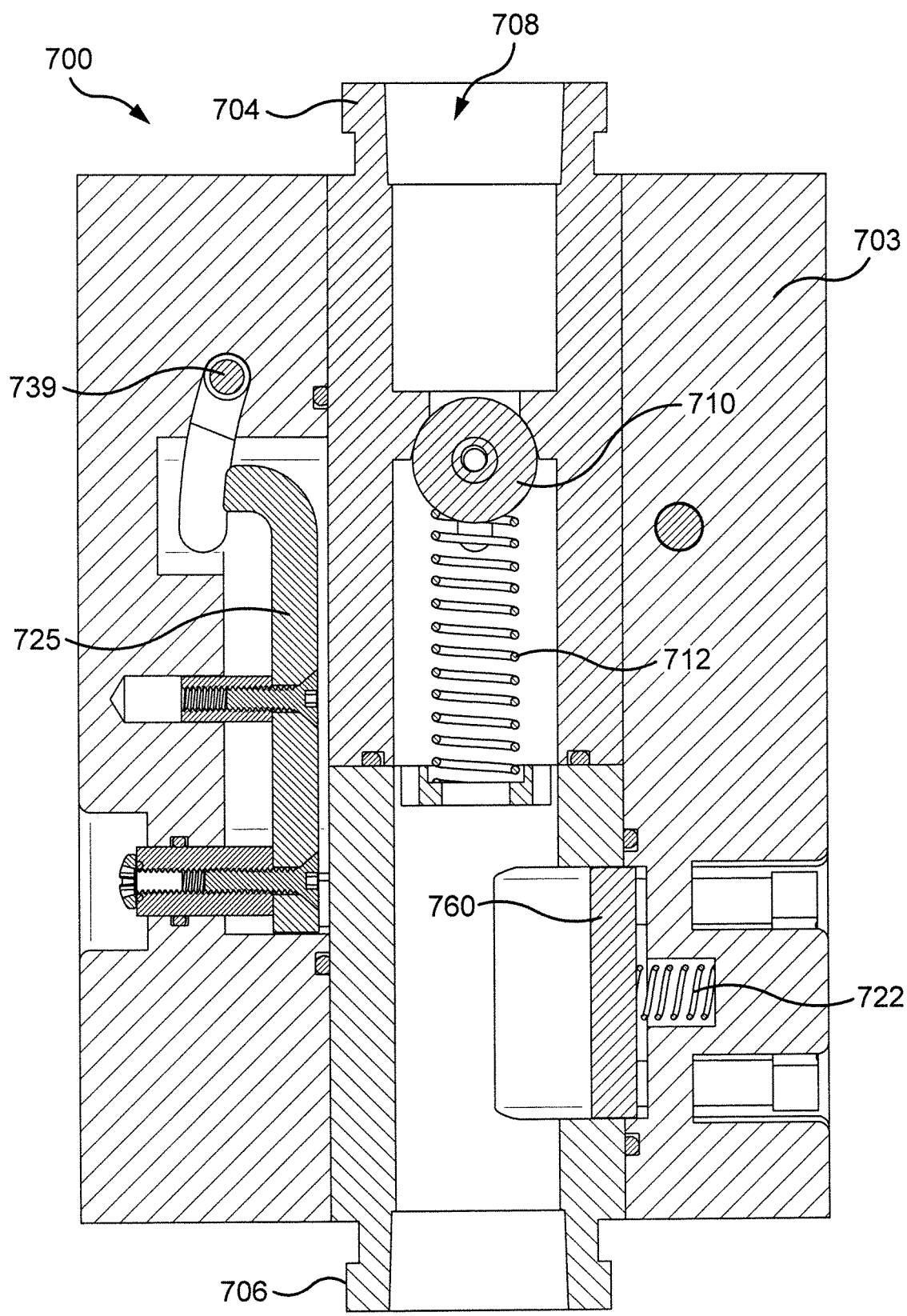
FIG. 24C shows a cross-sectional view of the inline device according to the embodiment of FIGS. 21A-B, in an open position over-pressurized above the allowable limit.
Figure 24D:
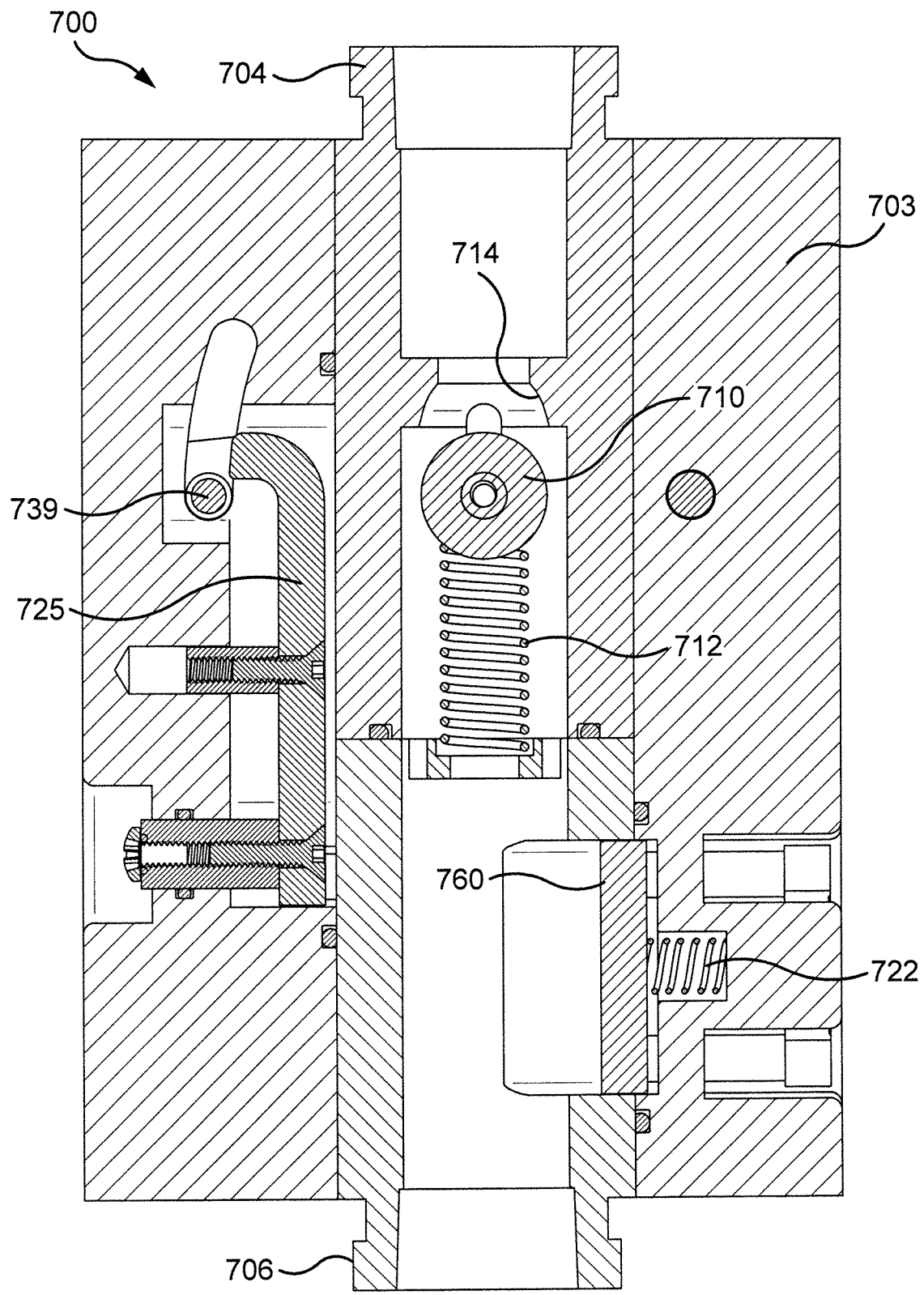
FIG. 24D shows a cross-sectional view of the inline device according to the embodiment of FIGS. 21A-B, in a reset position.

FIGS. 19-20 show a device 600 according to another embodiment of this invention. The device 600 includes a housing 602 with a longitudinal passage 608 and a seal seat 614. The sealing member is a ball seal 610, having a shaft 652 extending therethrough and engaging with wall slots 607 of the housing 602. A longitudinal spring 612 biases the ball seal 610 toward the seat 614. The locking mechanism includes more than one locking element, and more precisely four locking elements 620, each positioned on one of four sides of the ball seal 610. The locking elements 620 include a curved face 625 that corresponds to the upper curved surface of the ball seal 610. Each locking element 620 is biased with a corresponding lateral spring 622. The device 600 as illustrated is for single use, but could also incorporate one or more reset mechanisms, such as disclosed above.

FIGS. 21-24 illustrate a device 700 according to yet another embodiment of this invention. The device 700 includes an inner housing 702 including a passage 708 extending between pipeline fitments 704 and 706. The inner housing 702 is enclosed in an outer housing 703, formed of individual panels fastened about the inner housing 702. The sealing member is a ball seal 710 biased with a longitudinal spring 712, toward a ball seat 514 (See FIGS. 24A-D). The ball seal 710 within the ball seat 714 again closes off the fluid flow through the pipeline. The ball seal 710 is secured between two lever arms 730, such as by one shaft or two shaft pins 735. The lever arms 730 are external of the inner housing 702 and secured in shaped recesses 734 of side panels 736 of the outer housing 703. The lever arms are connected together at each end by bars 738, 739. Bar 738 serves as a rotational axis for the movable lever arms 730, and pivot bar 739 is used in combination with the locking mechanism.

The locking mechanism of FIGS. 21-24 includes a lock element 720 that extends on both opposing sides, and through the inner housing 702. Overpressure (e.g., 2 psi) within the passage 708 pushes on pressure plate 760, which is biased by lateral spring 722. The movement of pressure plate 760, beginning in FIG. 24B, causes lock arm 725 to release off bar 729 as shown in FIG. 24C. Spring 712 then biases ball seal 710 to the closed position against seal seat 714, as shown in FIG. 24C. The device 700 can be reset by an outer end of shaft 738, which extends through the outer housing 703, and includes a seat 770 for a tool such as a screwdriver, or other equivalent manual actuator. Rotating the bar 738 (from shut "S" to open "O" in FIG. 21A) returns the ball seal 710 to the open position. The lock 720 can be reengaged by pushing on reset surface 762 in FIG. 21B, to return the lock arm 725 over bar 739.

Thus the invention provides an inline overpressure protection device. The device can easily be installed in existing pipelines to passively monitor for overpressure, and to keep such overpressure from reaching meters and interior appliances. The sizes, shapes, and configurations, as well as the spring forces used can be varied to predetermined sizes, depending on need.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A device for shutting off fluid-flow in a pipe; the device comprising:
   a moveable sealing member inside a pipeline;

a longitudinal spring configured to bias against the sealing member in a first direction; and
a lateral spring at an angle to the longitudinal spring; and
a lock element between an end of the lateral spring and a surface of the sealing member, wherein the lateral spring is configured to bias the lock element against the surface of the sealing member in a second direction.

2. The device according to claim 1, wherein the first direction is toward a closed position.

3. The device according to claim 2, wherein the lateral spring maintains the sealing member in an open position, and a spring pressure of the lateral spring is less than a predetermined overpressure of a fluid in the pipeline.

4. The device according to claim 1, wherein the lateral spring compresses upon a pipeline overpressure against the lock element, to move the lock element off the surface of the sealing member and release the sealing member to close the pipeline.

5. The device according to claim 1, wherein the lateral spring is perpendicular to the longitudinal spring.

6. The device according to claim 1, wherein the sealing member extends into a seal seat to close off the pipeline upon an overpressure within the pipeline.

7. The device according to claim 6, wherein the sealing member is a ball seal configured extend into a ball seat to close off the pipeline.

8. The device according to claim 6, further comprising a lever to retract and reset the sealing member.

9. A device for shutting off fluid-flow in a pipe; the device comprising:
a moveable sealing member inside a pipeline;
a housing enclosing the sealing member, the housing including a passage configured to be positioned inline with the pipeline;
a longitudinal spring configured to bias against the sealing member in a first direction, wherein the sealing member extends into a seal seat to close off the pipeline upon an overpressure within the pipeline;
a lateral spring at an angle to the longitudinal spring wherein the lateral spring is configured to bias against the sealing member in a second direction; and
a lever to retract and reset the sealing member, wherein the lever extends outside of the housing, and comprises a shaft extending through the sealing element.

10. The device according to claim 9, wherein the housing includes a lock element passage, wherein overpressure within the pipeline pushes the lock element into the lock element passage and compresses the lateral spring.

11. A device for shutting off fluid-flow in a pipe; the device comprising:
a moveable sealing member inside a pipeline;
a longitudinal spring configured to bias against the sealing member in a first direction;
a lateral spring at an angle to the longitudinal spring wherein the lateral spring is configured to bias against the sealing member in a second direction; and
a removable cartridge including the sealing member, the longitudinal spring, and the lateral spring, wherein the removable cartridge is removable and replaceable within a housing.

12. A device for shutting off fluid-flow in a pipe; the device comprising:
a housing with a passage configured to be positioned inline with a pipeline, the passage including a sealing seat;
a sealing member inside the housing;
a longitudinal spring biased against the sealing member toward the sealing seat;
a locking element biased against a surface of the sealing member to maintain an open position with the sealing member off of the sealing seat, wherein the locking element is configured to move off the surface of from the sealing member upon a fluid overpressure in the passage, whereby the sealing member extends into the seal seat to close off the pipeline upon the overpressure.

13. The device according to claim 12, further comprising a lateral spring biased against the locking element.

14. A device for shutting off fluid-flow in a pipe; the device comprising:
a housing with a passage configured to be positioned inline with a pipeline, the passage including a sealing seat, the housing further including a locking element passage;
a sealing member inside the housing;
a longitudinal spring biased against the sealing member toward the sealing seat; and
a locking element biased against the sealing member to maintain an open position with the sealing member off of the sealing seat, wherein the locking element is configured to move from the sealing member upon a fluid overpressure in the passage, and the fluid overpressure within the passage pushes the lock element into the locking element passage and off the sealing member, whereby the sealing member extends into the seal seat to close off the pipeline upon the overpressure.

15. The device according to claim 12, wherein the sealing member is a ball seal configured to extend into a ball seat to close off the pipeline.

16. The device according to claim 12, further comprising a lever to retract the sealing member to the open position.

17. The device according to claim 16, wherein the lever extends outside of the housing, and comprises a shaft extends through the sealing element, wherein the lever comprises a rotation axis that is offset from the shaft.

18. The device according to claim 12, further comprising a removable cartridge including the sealing member, the longitudinal spring, and the locking element, wherein the removable cartridge is removable and replaceable within the housing.

19. The device according to claim 1, wherein the lock element is fully enclosed in a lateral lock element passage.

20. The device according to claim 1, wherein a surface of the lock element is directly abutting the surface of the sealing member.

* * * * *